(12) United States Patent
Hajimiri et al.

(10) Patent No.: US 12,289,147 B2
(45) Date of Patent: Apr. 29, 2025

(54) ARRAY SHAPE RECONSTRUCTION FOR DISTRIBUTED SYSTEMS

(71) Applicant: California Institute of Technology, Pasadena, CA (US)

(72) Inventors: Seyed Ali Hajimiri, La Canada, CA (US); Oren Mizrahi, Pasadena, CA (US); Austin C. Fikes, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 104 days.

(21) Appl. No.: 18/057,052

(22) Filed: Nov. 18, 2022

(65) Prior Publication Data

US 2023/0155649 A1 May 18, 2023

Related U.S. Application Data

(60) Provisional application No. 63/296,217, filed on Jan. 4, 2022, provisional application No. 63/280,943, filed on Nov. 18, 2021.

(51) Int. Cl.
    *H04B 7/06*         (2006.01)
    *H01Q 21/29*     (2006.01)

(52) U.S. Cl.
    CPC ........... *H04B 7/0608* (2013.01); *H01Q 21/29* (2013.01)

(58) Field of Classification Search
    CPC ........ H04B 7/0608; H01Q 21/29; H01Q 3/01; H01Q 3/2605
    See application file for complete search history.

(56) References Cited

U.S. PATENT DOCUMENTS

| 4,779,005 A | 10/1988 | Arnold | |
|---|---|---|---|
| 6,512,487 B1 * | 1/2003 | Taylor | H01Q 9/285 |
| | | | 343/797 |

(Continued)

FOREIGN PATENT DOCUMENTS

| CN | 108988948 A | 12/2018 |
|---|---|---|
| CN | 116075978 A | 5/2023 |

(Continued)

OTHER PUBLICATIONS

B. D. Braaten et al., "A Self-Adapting Flexible (Selflex) Antenna Array for Changing Conformal Surface Applications," in IEEE Transactions on Antennas and Propagation, vol. 61, No. 2, pp. 655-665, Feb. 2013. <br> (Year: 2013).*

(Continued)

*Primary Examiner* — Sam K Ahn
*Assistant Examiner* — Amneet Singh
(74) *Attorney, Agent, or Firm* — KPPB LLP

(57) ABSTRACT

Disclosed herein is a reconfigurable phased array and a method for determining the current configuration of a phased array. Certain disclosed embodiments include a reconfigurable phased array including a constellation of antennas configured to receive and transmit radiation towards a far field target. Each of the antennas senses incidental power from the retransmitted radiation from the other antennas of the constellation of antennas. This incidental power may be referred to as mutual coupling. The reconfigurable phased array further includes a computer system configured to: measure the incidental power sensed by the each of the antennas; perform a physical constraint mapping of the constellation of antennas; perform an array shape construction to determine a current position of all the elements based on the physical constraint mapping of the (Continued)

constellation of antennas and the incidental power sensed by each of the antennas.

25 Claims, 33 Drawing Sheets
(31 of 33 Drawing Sheet(s) Filed in Color)

(56) References Cited

U.S. PATENT DOCUMENTS

| | | |
|---|---|---|
| 6,778,843 B2 | 8/2004 | Oura |
| 6,831,600 B1 | 12/2004 | Cherrette et al. |
| 7,848,719 B2 | 12/2010 | Krishnaswamy et al. |
| 9,014,568 B2 | 4/2015 | Qian et al. |
| 9,214,739 B2 | 12/2015 | Sover et al. |
| 9,356,704 B1 | 5/2016 | Zanoni et al. |
| 10,061,125 B2 | 8/2018 | Hajimiri et al. |
| 10,944,477 B2 | 3/2021 | Fatemi et al. |
| 11,112,491 B2 | 9/2021 | Abediasl et al. |
| 11,249,370 B2 | 2/2022 | Hajimiri |
| 11,601,183 B2 | 3/2023 | Hajimiri et al. |
| 12,021,312 B2 | 6/2024 | Gal et al. |
| 2001/0046844 A1 | 11/2001 | Oura |
| 2003/0054790 A1 | 3/2003 | Sanada et al. |
| 2004/0087294 A1 | 5/2004 | Wang |
| 2005/0255387 A1 | 11/2005 | Butt et al. |
| 2006/0246911 A1 | 11/2006 | Petermann |
| 2007/0046547 A1 | 3/2007 | Crouch |
| 2007/0159407 A1 | 7/2007 | Bolle et al. |
| 2008/0252546 A1 | 10/2008 | Mohamadi |
| 2009/0267835 A1* | 10/2009 | Tietjen ............ H01Q 9/12 342/368 |
| 2009/0274466 A1 | 11/2009 | Cox et al. |
| 2010/0067602 A1 | 3/2010 | Noel et al. |
| 2010/0178065 A1 | 7/2010 | Nishihara et al. |
| 2011/0217970 A1 | 9/2011 | Ben et al. |
| 2012/0002967 A1 | 1/2012 | Mayer et al. |
| 2012/0039366 A1 | 2/2012 | Wood et al. |
| 2012/0139810 A1 | 6/2012 | Faraone et al. |
| 2013/0093624 A1 | 4/2013 | Raczkowski et al. |
| 2015/0244387 A1 | 8/2015 | Fleishman |
| 2016/0048708 A1 | 2/2016 | Sandler et al. |
| 2016/0054431 A1 | 2/2016 | Zou et al. |
| 2017/0026096 A1 | 1/2017 | Roh et al. |
| 2017/0029107 A1 | 2/2017 | Emami et al. |
| 2017/0059684 A1 | 3/2017 | Robinson et al. |
| 2017/0184699 A1 | 6/2017 | Honma et al. |
| 2018/0020416 A1 | 1/2018 | Smith et al. |
| 2018/0039154 A1 | 2/2018 | Hashemi et al. |
| 2018/0041270 A1 | 2/2018 | Buer et al. |
| 2018/0123699 A1 | 5/2018 | Fatemi et al. |
| 2018/0241122 A1 | 8/2018 | Jalali Mazlouman et al. |
| 2019/0020407 A1 | 1/2019 | Gharavi et al. |
| 2019/0028378 A1 | 1/2019 | Houjyo et al. |
| 2019/0056499 A1 | 2/2019 | Fatemi et al. |
| 2019/0165448 A1 | 5/2019 | Polehn et al. |
| 2019/0361102 A1 | 11/2019 | Price et al. |
| 2020/0106499 A1 | 4/2020 | Branlund |
| 2020/0169306 A1 | 5/2020 | Kim et al. |
| 2020/0192179 A1 | 6/2020 | Hajimiri |
| 2020/0204244 A1 | 6/2020 | Hajimiri et al. |
| 2020/0266879 A1 | 8/2020 | Chia et al. |
| 2020/0373662 A1 | 11/2020 | Gleason et al. |
| 2021/0105092 A1 | 4/2021 | Hajimiri et al. |
| 2022/0021114 A1 | 1/2022 | Gal et al. |
| 2022/0189864 A1 | 6/2022 | Yazdani |

FOREIGN PATENT DOCUMENTS

| | | |
|---|---|---|
| EP | 4182998 A1 | 5/2023 |
| WO | 200031982 A2 | 6/2000 |
| WO | 2000031982 A2 | 6/2000 |
| WO | 2015135003 A2 | 9/2015 |
| WO | 2018218003 A1 | 11/2018 |
| WO | 2020132126 A1 | 6/2020 |
| WO | 2020132611 A1 | 6/2020 |
| WO | 2022016110 A1 | 1/2022 |

OTHER PUBLICATIONS

A. C. Fikes, A. Safaripour, F. Bohn, B. Abiri and A. Hajimiri, "Flexible, Conformal Phased Arrays with Dynamic Array Shape Self-Calibration," 2019 IEEE MTT-S International Microwave Symposium (IMS), Boston, MA, USA, 2019, pp. 1458-1461 (Year: 2019).*
Z. Jiajia, C. Hui, J. Zhengyan and L. Xiaofei, "Mutual coupling self-calibration algorithm for 8-shaped double circular array," 2017 36th Chinese Control Conference (CCC), Dalian, China, 2017, pp. 5130-5135 (Year: 2017).*
Niknejad, "Electromagnetics for High-Speed Analog and Digital Communication Circuits", Cambridge University Press, 2007, 10 pgs.
Skolnik, "Radar Handbook", Second Edition, McGraw-Hill, 1990, 36 pgs.
International Preliminary Report on Patentability for International Application PCT/US2019/067262, Report issued Jun. 16, 2021, Mailed Jul. 1, 2021, 9 pgs.
International Preliminary Report on Patentability for International Application PCT/US2019/068115, Report issued Jun. 16, 2021, Mailed Jul. 1, 2021, 13 pgs.
International Preliminary Report on Patentability for International Application PCT/US2021/042069, Report issued Jan. 17, 2023, Mailed on Jan. 26, 2023, 8 pgs.
International Search Report and Written Opinion for International Application No. PCT/US2021/042069, Search completed Nov. 5, 2021, Mailed on Nov. 5, 2021, 10 pgs.
International Search Report and Written Opinion for International Application No. PCT/US2019/067262, Search completed Feb. 21, 2020, Mailed Mar. 19, 2020, 13 pgs.
International Search Report and Written Opinion for International Application No. PCT/US2019/068115, Search completed Feb. 13, 2020, Mailed Mar. 18, 2020, 18 pgs.
"Altera: Time Delay Digital Beamforming", Altera Corporation, Reference Design Datasheet, Retrieved from: https://www.intel.cn/content/dam/www/programmable/US/en/pdfs/literature/ds/time_delay_digita_beamforming_11.pdf, Apr. 2014, 1 pg.
Abbas, "Beamforming Techniques for Millimeter Wave Relay Networks", PhD Thesis, University of Manchester, 2017, 168 pgs.
Abiri et al., "A 1-D Heterodyne Lens-Free Optical Phased Array Camera With Reference Phase Shifting", IEEE Photonics Journal, vol. 10, No. 5, Sep. 2018, 13 pgs., doi: 10.1109/JPHOT.2018.2871823.
Aflatouni et al., "Nanophotonic projection system", Optics Express, Optical Society of America, vol. 23, No. 16, Aug. 10, 2015, 11 pgs., doi: 10.1364/OE.23.021012.
Agrawal, "Fiber-Optic Communication Systems", Wiley Interscience, 2002, 563 pgs. (Presented in 2 parts).
Ahmed et al., "A Survey on Hybrid Beamforming Techniques in 5G: Architecture and System Model Perspectives", IEEE Communications Surveys & Tutorials, vol. 20, No. 4, Fourth Quarter 2018, Jun. 4, 2018, pp. 3060-3097.
Akiba et al., "Photonic Architecture for Beam Forming of RF Phased Array Antenna", Optical Fiber Communication Conference, OSA Technical DigestMarch 2014, 3 pgs., doi: 10.1364/OFC.2014.W2A.51.
Akima et al., "A 10 GHz frequency-drift temperature compensated LC VCO with fast-settling low-noise voltage regulator in 0.13 μm CMOS", Proceedings of the Custom Integrated Circuits Conference, Oct. 2010, pp. 1-4, doi: 10.1109/CICC.2010.5617448.
Allard et al., "Radiation pattern synthesis for arrays of conformal antennas mounted on arbitrarily-shaped three-dimensional platforms using genetic algorithms", IEEE Transactions on Antennas and Propagation, vol. 51, No. 5, May 2003, pp. 1054-1062, doi: 10.1109/tap.2003.811510.

(56) References Cited

OTHER PUBLICATIONS

Bailin et al., "The radiation field produced by a slot in a large circular cylinder", IRE Transactions on Antennas and Propagation, vol. 3, No. 3, Jul. 1955, pp. 128-137, doi: 10.1109/TAP.1955.1144301.

Beas et al., "Millimeter-Wave Frequency Radio over Fiber Systems: A Survey", IEEE Communications Surveys & Tutorials, vol. 15, No. 4, Mar. 2013, pp. 1593-1619, doi: 10.1109/SURV.2013.013013.00135.

Bekers et al., "Mutual-coupling based phased-array calibration: A robust and versatile approach", 2013 IEEE International Symposium on Phased Array Systems and Technology, 2013, pp. 630-637.

Brautigam et al., "Terrasar-x instrument calibration results and extension for tandem-x", IEEE Transactions on Geoscience and Remote Sensing, vol. 48, No. 2, Feb. 2010, pp. 702-715, doi: 10.1109/tgrs.2009.2030673.

Chang et al., "A temperature compensated VCO using feed-forward gain multiplication for cellular applications", IEEE Radio Frequency Integrated Circuits Symposium (RFIC), May 2015, pp. 187-190, doi: 10.1109/RFIC.2015.7337736.

Cho et al., "A True Time Delay-Based SiGe Bi-directional T/R Chipset for Large-Scale Wideband Timed Array Antennas", IEEE Radio Frequency Integrated Circuits Symposium (RFIC), Jun. 2018, pp. 272-275, doi: 10.1109/RFIC.2018.8428977.

Chu et al., "A True Time-Delay-Based Bandpass Multi-Beam Array at mm-Waves Supporting Instantaneously Wide Bandwidths", 2010 IEEE International Solid-State Circuits Conference (ISSCC), Feb. 7-11, 2010, pp. 38-40.

Chu et al., "True-Time-Delay-Based Multi-Beam Arrays", IEEE Transactions on Microwave Theory and Techniques, vol. 61, No. 8, Aug. 2013, pp. 3072-3082, doi: 10.1109/TMTT.2013.2271119.

Chung et al., "A 1024-Element Scalable Optical Phased Array in 0.18 SOI CMOS", 2017 International Solid-State Circuits Conference, 2017, 12 pgs., doi: 10.1109/ISSCC.2017.7870361.

Cripps, "RF power amplifiers for wireless communications", Boston: Artech House, 2006, 473 pgs. (Presented in 2 parts).

Debaes et al., "High-impedance high-frequency silicon detector response for precise receiverless optical clock injection", Proceedings of the SPIE, vol. 4654, Mar. 27, 2002, pp. 78-88, doi: 10.1117/12.463842.

Dimas et al., "Cooperative Beamforming with Predictive Relay Selection for Urban mmWave Communications", IEEE Access, vol. 4, 2016, pp. 157057-157071, doi: 10.1109/ACCESS.2017.DOI.

Dokmanic et al., "Euclidean distance matrices: Essential theory, algorithms, and applications", IEEE Signal Processing Magazine, vol. 32, No. 6, Nov. 2015, 17 pgs.

Dunworth et al., "A 28GHz Bulk-CMOS dual-polarization phased-array transceiver with 24 channels for 5G user and basestation equipment", 2018 IEEE International Solid—State Circuits Conference—(ISSCC), Feb. 2018, pp. 70-72, doi: 10.1109/ISSCC.2018.8310188.

Eberle et al., "The flared slot: A moderately directive flush-mounted broad-band antenna", IRE Transactions on Antennas and Propagation, vol. 8, No. 5, Sep. 1960, pp. 461-468, doi: 10.1109/tap.1960.1144889.

Fatemi et al., "A nonuniform sparse 2-d large-fov optical phased array with a low-power pwm drive", IEEE Journal of Solid-State Circuits, vol. 54, No. 5, May 2019, pp. 1200-1215, doi: 10.1109/jssc.2019.2896767.

Fatemi et al., "High sensitivity active flat optics optical phased array receiver with a two-dimensional aperture", Optics Express, vol. 26, No. 23, Nov. 12, 2018, 17 pgs., doi: 10.1364/OE.26.029983.

Fikes et al., "A framework for array shape reconstruction through mutual coupling", IEEE Transactions on Microwave Theory and Techniques, vol. 69, No. 10, Oct. 2021, pp. 4422-4436, doi: 10.1109/tmtt.2021.3097729.

Gal-Katziri et al., "A 28 GHz Optically Synchronized CMOS Phased Array with an Integrated Photodetector", IEEE Radio Frequency Integrated Circuits Symposium (RFIC), Jun. 2021, 4 pgs., doi: 10.1109/RFIC51843.2021.9490452.

Gal-Katziri et al., "A Sub-Picosecond Hybrid DLL for Large-Scale Phased Array Synchronization", IEEE Asian Solid-State Circuits Conference (A-SSCC), 2018, pp. 231-234, doi: 10.1109/ASSCC.2018.8579340.

Gal-Katziri et al., "Scalable, deployable, flexible phased array sheets", 2020 IEEE/MTT-S International Microwave Symposium (IMS), 2020, pp. 1085-1088.

Gao, "High-resolution phased array radar imaging by photonics-based broadband digital beamforming", Optics Express, vol. 27, No. 9, Apr. 29, 2019, pp. 13194-13203, doi: 10.1364/OE.27.013194.

Garakoui et al., "Compact Cascadable gm-C All-Pass True Time Delay Cell with Reduced Delay Variation over Frequency", IEEE Journal of Solid-State Circuits, vol. 50, No. 3, Mar. 1, 2015, first published Feb. 15, 2014, pp. 693-703, doi: 10.1109/JSSC.2015.2390214.

Gardner, "Charge-pump phase-lock loops", IEEE Transactions on Communications, vol. COM-28, No. 11, Nov. 1980, pp. 1849-1858, doi: 10.1109/TCOM.1980.1094619.

Gaudino et al., "Perspective in Next-Generation Home Networks: Toward Optical Solutions?", IEEE Communications Magazine, vol. 48, No. 2, Feb. 2010, pp. 39-47, doi: 10.1109/MCOM.2010.5402662.

Ghaderi et al., "An Integrated Discrete-Time Delay Compensating Technique for Large-Array Beamformers", IEEE Transactions on Circuits and Systems—I: Regular Papers, vol. 66, No. 9, Sep. 2019, pp. 3296-3306, doi: 10.1109/TCSI.2019.2626309.

Goodman et al., "Optical interconnections for VLSI systems", Proceedings of the IEEE, vol. 72, No. 7, Jul. 1984, pp. 850-866, doi: 10.1109/PROC.1984.12943.

Grant et al., "CVX: Matlab software for disciplined convex programming, version 2.1", Posted Mar. 2014, Retrieved from Internet: <http://cvxr.com/cvx>, 2 pgs.

Hajimiri et al., "Dynamic Focusing of Large Arrays for Wireless Power Transfer and Beyond", IEEE Journal of Solid-State Circuits, Nov. 2020, 25 pgs., doi: 10.1109/JSSC.2020.3036895.

Hajimiri et al., "Integrated Phased Array Systems in Silicon", IEEE Communications Magazine, vol. 93, No. 9, Sep. 2005, pp. 1637-1655, doi: 10.1109/JPROC.2005.852231.

Hajimiri et al., "Phased Array Systems in Silicon", Topics in Circuits for Communications, IEEE Communications Magazine, vol. 42, No. 8, Aug. 2004, pp. 122-130, doi: 10.1109/mcom.2004.1321403.

Hashemi et al., "A flexible phased array system with low areal mass density", Nature Electronics, vol. 2, May 17, 2019, pp. 195-205, doi: 10.1038/s41928-019-0247-9.

Haupt, "Genetic algorithm applications for phased arrays", Applied Computational Electromagnetics Society Journal, vol. 21, No. 3, Nov. 2006, pp. 325-336.

Havary-Nassab et al., "Distributed Beamforming for Relay Networks Based on Second-Order Statistics of the Channel State Information", IEEE Transactions on Signal Processing, vol. 56, No. 9, Sep. 2008, pp. 4306-4316, doi: 10.1109/TSP.2008.925945.

Haykin et al., "Modern Wireless Communication", 1st Edition New Jersey: Prentice Hall, 2004, 289 pgs. (Presented in 2 parts).

He et al., "Long-distance telecom-fiber transfer of a radio-frequency reference for radio astronomy", Optica, vol. 5, No. 2, Feb. 2018, pp. 138-146, doi: 10.1364/OPTICA.5.000138.

Hong et al., "A General Theory of Injection Locking and Pulling in Electrical Oscillators—Part I: Time-Synchronous Modeling and Injection Waveform Design", IEEE Journal of Solid-State Circuits, vol. 54, No. 8, Aug. 2019, pp. 2109-2121, doi: 10.1109/JSSC.2019.2908753.

Hong et al., "Multibeam Antenna Technologies for 5G Wireless Communications", IEEE Transactions on Antennas and Propagation, vol. 65, No. 12, Dec. 2017, pp. 6231-6249, doi: 10.1109/TAP.2017.2712819.

Horvat, "True Time Domain Bandpass Beamforming", Thesis, Master of Applied Science, Engineering Science, Simon Fraser University, 1998, 104 pgs.

Hu et al., "17.6 A 21.7-to-26.5GHz Charge-Sharing Locking Quadrature PLL with Implicit Digital Frequency-Tracking Loop Achieving

(56) References Cited

OTHER PUBLICATIONS

75fs Jitter and -250dB FoM", IEEE International Solid-State Circuits Conference—(ISSCC), Feb. 2020, pp. 276-278, doi: 10.1109/ISSCC19947.2020.9063024.

Huang et al., "A Mm-Wave Wideband MIMO RX With Instinctual Array-Based Blocker/Signal Management for Ultralow-Latency Communication", IEEE Journal of Solid-State Circuits, vol. 54, No. 12, Dec. 2019, first published Oct. 24, 2019, pp. 3553-3564, doi: 10.1109/JSSC.2019.2945267.

Huang et al., "Microfluidic serpentine antennas with designed mechanical tunability", Lab on a Chip, vol. 14, No. 21, Nov. 2014, pp. 4205-4212, doi: 10.1039/c4lc00762j.

Jang et al., "A 1-GHz 16-Element Four-Beam True-Time-Delay Digital Beamformer", IEEE Journal of Solid-State Circuits, vol. 54, No. 5, 2019, pp. 1304-1314, doi: 10.1109/JSSC.2019.2894357.

Jang et al., "A True Time Delay 16-Element 4-Beam Digital Beamformer", 2018 IEEE Radio Frequency Integrated Circuits Symposium (RFIC), Jun. 10-12, 2018, pp. 12-15, doi: 10.1109/rfic.2018.8429016.

Jeon et al., "A Scalable 6-to-18 GHz Concurrent Dual-Band Quad-Beam Phased-Array Receiver in CMOS", IEEE Journal of Solid-State Circuits, vol. 43, No. 12, Jan. 2009, pp. 2660-2673, doi: 10.1109/JSSC.2008.2004863.

Jing et al., "Network Beamforming Using Relays with Perfect Channel Information", IEEE Transactions on Information Theory, vol. 55, No. 6, 2009, 33 pgs., arXiv:0804.1117 [cs.IT], Apr. 7, 2008.

Jones et al., "A wide-band transverse-slot flush-mounted array", IRE Transactions on Antennas and Propagation, vol. 8, No. 4, 1960, pp. 401-407, doi: 10.1109/tap.1960.1144864.

Josefsson et al., "Conformal Array Antenna Theory and Design", IEEE Press Series on Electromagnetic Wave Theory, 2006, 488 pgs. (Presented in 2 parts).

Kalia et al., "A Simple, Unified Phase Noise Model for Injection-Locked Oscillators", IEEE Radio Frequency Integrated Circuits Symposium, Jun. 2011, 3 pgs., doi: 10.1109/RFIC.2011.5940707.

Kang et al., "Low-cost multistandard radio-over-fiber downlinks based on CMOS-compatible Si avalanche photodetectors", IEEE Photonics Technology Letters, vol. 21, No. 7, Apr. 2009, pp. 462-464, doi: 10.1109/LPT.2009.2013356.

Kaukovuori et al., "Analysis and Design of Passive Polyphase Filters", IEEE Transactions on Circuits and Systems I: Regular Papers, vol. 55, No. 10, Feb. 7, 2008, pp. 3023-3037, doi: 10.1109/TCSI.2008.917990.

Kern, "PLL-Based Active Optical Clock Distribution", Thesis, Sep. 2004, 105 pgs.

Kobayashi et al., "Simple calculation method for conformal beamscanning array pattern", 2019 13th European Conference on Antennas and Propagation (EuCAP), 2019, pp. 1-5.

Komljenovic et al., "On-chip calibration and control of optical phased arrays", Optics Express, vol. 26, No. 3, Feb. 5, 2018, pp. 3199-3210, doi: 10.1364/OE.26.003199.

Kutty et al., "Beamforming for Millimeter Wave Communications: An Inclusive Survey", IEEE Communications Surveys & Tutorials, vol. 18, No. 2, Second Quarter 2016, Electronic Publication: Dec. 1, 2015, pp. 949-973, doi: 10.1109/COMST.2015.2504600.

Laneman et al., "An efficient protocol for realizing cooperative diversity in wireless networks", Proceedings, 2001 IEEE International Symposium on Information Theory (IEEE Cat. No. 01CH37252), Jun. 24-29, 2001, p. 294, doi: 10.1109/ISIT.2001.936157.

Lau et al., "Ultra-Stable RF-Over-Fiber Transport in NASA Antennas, Phased Arrays and Radars", Journal of Lightwave Technology, vol. 32, No. 20, Oct. 15, 2014, pp. 3440-3451, doi: 10.1109/JLT.2014.2312930.

Lee et al., "A silicon avalanche photodetector fabricated with standard CMOS technology with over 1 THz gain-bandwidth product", Optics Express, vol. 18, No. 23, Nov. 2010, pp. 24189-24194, doi: 10.1364/OE.18.024189.

Lee et al., "Optical-Power Dependence of Gain, Noise, and Bandwidth Characteristics for 850-nm CMOS Silicon Avalanche Photodetectors", IEEE Journal of Selected Topics in Quantum Electronics, vol. 20, No. 6, Nov.-Dec. 2014, pp. 211-217, doi: 10.1109/JSTQE.2014.2327796.

Lee et al., "Performance Optimization and Improvement of Silicon Avalanche Photodetectors in Standard CMOS Technology", IEEE Journal of Selected Topics in Quantum Electronics, vol. 24, No. 2, Mar.-Apr. 2018, pp. 1-13, doi: 10.1109/JSTQE.2017.2754359.

Leu et al., "Injection-locked clock receiver for monolithic optical link in 45nm SOI", IEEE Asian Solid-State Circuits Conference, Nov. 2011, pp. 149-152, doi: 10.1109/ASSCC.2011.6123624.

Liu et al., "A Temperature Compensated Triple-Path PLL With KVCO Non-Linearity Desensitization Capable of Operating at 77 K", IEEE Transactions on Circuits and Systems I: Regular Papers, vol. 64, No. 11, May 2017, pp. 1-9, doi: 10.1109/TCSI.2017.2704023.

Matsko, "Advances in the Development of Spectrally Pure Microwave Photonic Synthesizers", IEEE Photonics Technology Letters, vol. 31, No. 23, Dec. 1, 2019, pp. 1882-1885, doi: 10.1109/LPT.2019.2947901.

McIntosh et al., "Fopair: A focused array imaging radar for ocean remote sensing", IEEE Transactions on Geoscience and Remote Sensing, vol. 33, No. 1, 1995, pp. 115-124, doi: 10.1109/36.368216.

McIntyre, "A new look at impact ionization—Part I: A theory of gain, noise, breakdown probability, and frequency response", IEEE Transactions on Electron Devices, vol. 46, No. 8, Aug. 1999, pp. 1623-1631, doi: 10.1109/16.777150.

McIntyre, "Multiplication noise in uniform avalanche diodes", IEEE Transactions on Electron Devices, vol. ED-13, No. 1, Jan. 1966, pp. 164-168, doi: 10.1109/T-ED.1966.15651.

McIntyre, "The distribution of gains in uniformly multiplying avalanche photodiodes: Theory", IEEE Transactions on Electron Devices, vol. 19, No. 6, Jun. 1972, pp. 703-713, doi: 10.1109/T-ED.1972.17485.

Mercandelli et al., "17.5 A 12.5GHz Fractional-N Type-I Sampling PLL Achieving 58fs Integrated Jitter", 2020 IEEE International Solid-State Circuits Conference—(ISSCC), Feb. 16-20, 2020, pp. 274-276, doi: 10.1109/ISSCC19947.2020.9063135.

Mizrahi et al., "Flexible phased array shape reconstruction", 2021 IEEE/MTT-S International Microwave Symposium (IMS), 2021, 3 pgs.

Mondal et al., "A 2-GHz Bandwidth, 0.25-1.7 ns True-Time-Delay Element Using a Variable-Order All-Pass Filter Architecture in 0.13 µm CMOS", IEEE Journal of Solid-State Circuits, vol. 52, No. 8, Aug. 2017, pp. 2180-2193, doi: 10.1109/JSSC.2017.2693229.

Natarajan et al., "A 77-ghz phased-array transceiver with on-chip antennas in silicon: Transmitter and local lo-path phase shifting", IEEE Journal of Solid-State Circuits, vol. 41, No. 12, Dec. 2006, pp. 2807-2819, doi: 10.1109/JSSC.2006.884817.

Nayak et al., "A 10-GB/s-18.8 dBm Sensitivity 5.7 mW Fully-Integrated Optoelectronic Receiver With Avalanche Photodetector in 0.13-µm CMOS", IEEE Transactions on Circuits and Systems—I: Regular Papers, vol. 66, No. 8, Aug. 2019, pp. 3162-3173, doi: 10.1109/TCSI.2019.2909284.

Nishio et al., "A high-speed adaptive antenna array with simultaneous multiple-beamforming capability", IEEE Transactions on Microwave Theory and Techniques, vol. 3, Jul. 2003, pp. 1673-1676, doi: 10.1109/MWSYM.2003.1210460.

Ortega et al., "Optical Beamformer for 2-D Phased Array Antenna With Subarray Partitioning Capability", IEEE Photonics Journal, vol. 8, No. 3, Jun. 2016, 9 pgs., doi: 10.1109/JPHOT.2016.2550323.

Paciorek, "Injection locking of oscillators", Proceedings of the IEEE, vol. 53, No. 11, Nov. 1965, pp. 1723-1727, doi: 10.1109/PROC.1965.4345.

Pan et al., "An 18-GB/s Fully Integrated Optical Receiver With Adaptive Cascaded Equalizer", IEEE Journal of Selected Topics in Quantum Electronics, vol. 22, No. 6, Nove./Dec. 2016, pp. 361-369, doi: 10.1109/JSTQE.2016.2574567.

Pancheri et al., "Low-Noise Avalanche Photodiode in Standard 0.35-µm CMOS Technology", IEEE Transactions on Electron Devices, vol. 55, No. 1, Jan. 2008, First published Dec. 26, 2007, pp. 457-461, doi: 10.1109/TED.2007.910570.

Pang et al., "21.1 A 28GHz CMOS Phased-Array Beamformer Utilizing Neutralized Bi-Directional Technique Supporting Dual-

(56) References Cited

OTHER PUBLICATIONS

Polarized MIMO for 5G NR", IEEE International Solid-State Circuits Conference—(ISSCC), Feb. 2019, pp. 344-346, doi: 10.1109/ISSCC.2019.8662324.
Pang et al., "A 28-GHz CMOS Phased-Array Beamformer Utilizing Neutralized Bi-Directional Technique Supporting Dual-Polarized MIMO for 5G NR", IEEE Journal of Solid-State Circuits, vol. 55, No. 9, Sep. 2020, pp. 2371-2386, doi: 10.1109/JSSC.2020.2995039.
Pauchard et al., "Dead space effect on the wavelength dependence of gain and noise in avalanche photodiodes", IEEE Transactions on Electron Devices, vol. 47, No. 9, Sep. 2000, pp. 1685-1693, doi: 10.1109/16.861578.
Payne et al., "Photonic Techniques for Local Oscillator Generation and Distribution in Millimeter-Wave Radio Astronomy", International Topical Meeting on Microwave Photonics, Nov. 2002, pp. 9-12, doi: 10.1109/MWP.2002.1158847.
Perley et al., "The Expanded Very Large Array: A New Telescope for New Science", The Astrophysical Journal Letters, vol. 739, No. L1, Sep. 20, 2011, 5 pgs., doi: 10.1088/2041-8205/739/1/L1.
Poulton et al., "High-Performance Integrated Optical Phased Arrays for Chip-Scale Beam Steering and LiDAR", Conference on Lasers and Electro-Optics CLEO: Applications and Technology, Jan. 2018, 3 pgs., doi: 10.1364/CLEO_AT.2018.ATu3R.2.
Rajbhandari et al., "High-Speed Integrated Visible Light Communication System: Device Constraints and Design Considerations", IEEE Journal on Selected Areas in Communications, vol. 33, No. 9, 2015, pp. 1750-1757, doi: 10.1109/JSAC.2015.2432551.
Razavi, "A Study of Injection Locking and Pulling in Oscillators", IEEE Journal of Solid-State Circuits, vol. 39, No. 9, Sep. 2004, pp. 1415-1424, doi: 10.1109/JSSC.2004.831608.
Rigobello et al., "Pattern recovering of conformal antenna array for strongly deformed surfaces", 2017 11th European Conference on Antennas and Propagation (EUCAP), 2017, pp. 869-871.
Sadiku et al., "Comparison of approximate formulas for the capacitance of microstrip line", Proceedings 2007 IEEE SoutheastCon, Apr. 2007, pp. 427-432, doi: 10.1109/SECON.2007.342939.
Santiccioli et al., "17.2 A 66fsrmsJitter 12.8-to-15.2GHz Fractional-N Bang-Bang PLL with Digital Frequency-Error Recovery for Fast Locking", 2020 IEEE International Solid-State Circuits Conference—(ISSCC), Feb. 16-20, 2020, pp. 268-270, doi: 10.1109/ISSCC19947.2020.9063094.
Scaglione et al., "Opportunistic Large Arrays: Cooperative Transmission in Wireless Multihop Ad Hoc Networks to Reach Far Distances", IEEE Transactions on Signal Processing, vol. 51, No. 8, Aug. 2003, pp. 2082-2092, doi: 10.1109/TSP.2003.814519.
Schoebel et al., "Design considerations and technology assessment of phased-array antenna systems with rf mems for automotive radar applications", IEEE Transactions on Microwave Theory and Techniques, vol. 53, No. 6, 2005, pp. 1968-1975, doi: 10.1109/TMTT.2005.848838.
Sendonaris et al., "Increasing uplink capacity via user cooperation diversity", Proceedings, 1998 IEEE International Symposium on Information Theory (Cat. No. 98CH36252), Aug. 16-21, 1998, pp. 156, doi: 10.1109/ISIT.1998.708750.
Sendonaris et al., "User Cooperation Diversity—Part 1: System Description", IEEE Transactions on Communications, vol. 51, No. 11, Nov. 2003, pp. 1927-1938, doi: 10.1109/TCOMM.2003.818096.
Sendonaris et al., "User Cooperation Diversity—Part II: Implementation Aspects and Performance Analysis", IEEE Transactions on Communications, vol. 51, No. 11, Nov. 2003, pp. 1939-1948, doi: 10.1109/TCOMM.2003.819238.
Sengupta et al., "A 0.28 thz power-generation and beamsteering array in cmos based on distributed active radiators", IEEE Journal of Solid-State Circuits, vol. 47, No. 12, Dec. 2012, pp. 3013-3031, doi: 10.1109/JSSC.2012.2217831.
Seong et al., "Conformal array pattern synthesis on a curved surface with quadratic function using adaptive genetic algorithm", 2013 Asia-Pacific Microwave Conference (APMC), 2013, pp. 167-169, doi: 10.1109/APMC.2013.6695226.
Shahramian et al., "A Fully Integrated 384-Element, 16-Tile, W-Band Phased Array With Self-Alignment and Self-Test", IEEE Journal of Solid-State Circuits, vol. 54, No. 9, Sep. 2019, first published Aug. 6, 2019, pp. 2419-2434, doi: 10.1109/JSSC.2019.2928694.
Shillue et al., "The ALMA photonic local oscillator system", 2011 URSI General Assembly and Scientific Symposium, IEEE, Aug. 2011, 4 pgs., doi: 10.1109/ursigass.2011.6051254.
Shipley et al., "Mutual coupling-based calibration of phased array antennas", Proceedings 2000 IEEE International Conference on Phased Array Systems and Technology (Cat. No. 00TH8510), 2000, pp. 529-532, doi: 10.1109/PAST.2000.859012.
Sohrabi et al., "Hybrid Digital and Analog Beamforming Design for Large-Scale Antenna Arrays", arXiv.org, Retrieved from: https://arxiv.org/abs/1601.06814v1, Jan. 25, 2016, 13 pgs.
Strobel et al., "Communication in automotive systems: Principles, limits and new trends for vehicles, airplanes and vessels", 2010 12th International Conference on Transparent Optical Networks, Aug. 16, 2010, pp. 1-6, doi: 10.1109/ICTON.2010.5549163.
Synopsys: Sentaurus Device, [retrieved on Sep. 24, 2024]. Retrieved from the Internet: <URL: https://www.synopsys.com/manufacturing/tcad/device-simulation/sentaurus-device.html>, 4 pgs.
Tao et al., "An overview of cooperative communications", IEEE Communications Magazine, vol. 50, No. 6, Jun. 6, 2012, pp. 65-71, doi: 10.1109/MCOM.2012.6211487.
Tsinos et al., "On the Energy-Efficiency of Hybrid Analog-Digital Transceivers for Single- and Multi-carrier Large Antenna Array Systems", IEEE Journal on Selected Areas in Communications, vol. 35, No. 9, Sep. 2017, Electronic Publication: Jun. 28, 2017, 16 pgs., doi: 10.1109/JSAC.2017.2720918.
Van Overstraeten et al., "Measurement of the ionization rates in diffused silicon p-n junctions", Solid-State Electronics, vol. 13, No. 5, May 1970, pp. 583-608, doi: 10.1016/0038-1101(70)90139-5.
Vaskelaninen, "Iterative least-squares synthesis methods for conformal array antennas with optimized polarization and frequency properties", IEEE Transactions on Antennas and Propagation, vol. 45, No. 7, Jul. 1997, pp. 1179-1185, doi: 10.1109/8.596912.
Vorontsov et al., "Adaptive phase-distortion correction based on parallel gradient-descent optimization", Optics Letters, vol. 22, No. 12, Jun. 15, 1997, pp. 907-909, doi: 10.1364/ol.22.000907.
Williams et al., "Origami-inspired shape-changing phased array", 2020 50th European Microwave Conference (EuMC), Utrecht, The Netherlands, Jan. 2021, pp. 344-347, doi: 10.23919/EuMC48046.2021.9338189.
Xu et al., "Spectral and Energy Efficiency of Multi-pair Massive MIMO Relay Network with Hybrid Processing", arXiv.org, Retrieved from: https://arxiv.org/abs/1706.06743v2, Jun. 25, 2017, 15 pgs.
Yang et al., "Digital beamforming-based massive MIMO transceiver for 5g millimeter-wave communications", IEEE Transactions on Microwave Theory and Techniques, vol. 66, No. 7, Jul. 2018, pp. 3403-3418, doi: 10.1109/TMTT.2018.2829702.
You et al., "A 12GHz 67% tuning range 0.37pS RJrms PLL with LC-VCO temperature compensation scheme in 0.13 μm CMOS", IEEE Radio Frequency Integrated Circuits Symposium, Jun. 2014, pp. 101-104, doi: 10.1109/RFIC.2014.6851669.
Yuan et al., "A new look at impact ionization—Part II: Gain and noise in short avalanche photodiodes", IEEE Transactions on Electron Devices, vol. 46, No. 8, Aug. 1999, pp. 1632-1639, doi: 10.1109/16.777151.
Yuan et al., "A Simple Formula for the Estimation of the Capacitance of Two-Dimensional Interconnects in VLSI Circuits", IEEE Electron Device Letters, vol. EDL-3, No. 12, Dec. 1982, pp. 391-393, doi: 10.1109/EDL.1982.25610.
Zhang et al., "Hybridly-Connected Structure for Hybrid Beamforming in mmWave MIMO Systems", IEEE Transactions on Communications, vol. 66, No. 2, Feb. 2018, 13 pgs., doi: 10.1109/TCOMM.2017.2756882.

* cited by examiner

ARRAY SHAPE RECONSTRUCTION FOR DISTRIBUTED SYSTEMS

CROSS-REFERENCE TO RELATED APPLICATIONS

This application claims the benefit of and priority under 35 U.S.C. § 119(e) to U.S. Provisional Patent Application Ser. No. 63/280,943 entitled "Methods for Global Shape Reconstruction for Distributed Systems" filed Nov. 18, 2021, and U.S. Provisional Patent Application Ser. No. 63/296,217 entitled "Array Shape Reconstruction Through Mutual Coupling" filed Jan. 4, 2022, which are incorporated herein by reference in their entirety for all purposes.

FIELD OF THE INVENTION

The present invention generally relates to reconfigurable phased arrays incorporating a constellation of antennas and methods for determining the current configuration of phased arrays.

BACKGROUND

Antenna arrays continue to play a growing role in a broad range of applications, from communications, sensing, ranging, power transfer, projections, and imaging. In addition to planar arrays, conformal arrays, which are rigidly fixed to a nonplanar surface, have long been used in low profile (aerodynamically and/or visually) radio frequency (RF) systems, mostly for streamlining purposes. In mechanically static arrays, unusual shape and orientation of array elements may be analyzed and accounted for during the design phase as these systems are used for a single, rigid shape. With an unusual but known shape array, pattern synthesis may be utilized using geometric analysis and various optimization algorithms, including genetic algorithms. While these techniques are effective, array shape may not be static and known. Emerging applications using flexible microwave and mm-wave antenna arrays in wearables and light-weight, deployable apertures in space change shape dynamically, may include capabilities beyond conventional static conformal arrays. Flexible phased arrays, which can constantly change shape during deployment and operation, may also suffer from irregular element position and orientation. However, their antenna positions may not be known in advance and accounted for during design. As such, it may be advantageous to have flexible phased arrays which may be able to determine their shape and dynamically update phases to control beam coherence and direction during operation.

SUMMARY OF THE INVENTION

Various embodiments are directed to a reconfigurable phased array including: a constellation of antennas configured to receive and transmit radiation, where each of the antennas senses incidental power from the transmitted radiation from the other antennas of the constellation of antennas; a computer system configured to: measure the incidental power sensed by the each of the antennas; perform a physical constraint mapping of the constellation of antennas; perform an array shape construction to determine the current position of each of the antennas based on the physical constraint mapping and the incidental power sensed by each of the antennas.

In various other embodiments, the computer system is further configured to utilize the determined current position to determine antenna excitation configurations of the antennas.

In various other embodiments, the constellation of antennas is positioned on a flexible substrate.

In still various other embodiments, the flexible substrate is bendable to reposition the constellation of antennas into an ideal position of all the elements.

In still various other embodiments, the computer system is further configured to control the position of the constellation of antennas into the ideal position of all the elements.

In still various other embodiments, the physical constraint mapping utilizes the possible mutual angle, antenna distance, and/or local curvature of the constellation of antennas.

In still various other embodiments, the physical constraint mapping includes modeling the incidental power sensed by the each of the antennas into a raw mutual coupling matrix $S \in \mathbb{C}^{N \times N}$.

In still various other embodiments, the raw mutual coupling matrix is defined by:

$$S_{mn} = \frac{a_m D_m(\theta_{mn}) a_j D_n(\theta_{nm})}{|\vec{l}_{mn}|} e^{-j(\phi_m + \phi_n + k|\vec{l}_{mn}|)}; \text{ and}$$

$$\theta_{mn} = \cos^{-1}\left(\frac{\hat{r}_m \cdot \vec{l}_{mn}}{|\vec{l}_{mn}|}\right),$$

wherein $a_m$ is the total fixed amplitude offset in antenna m, $D_m(\theta)$ is the directivity of antenna m for an angle $\theta$ relative to broadside, $\vec{l}_{mn}$ is the vector pointing from the phase center of antenna i to the phase center of antenna n, $\phi_m$ is the total fixed phase offset in antenna m, and $\hat{r}_m$ is the unit vector normal to the surface of the array, that describes the orientation of antenna m.

In still various other embodiments, the physical constraint mapping further includes performing simulation and analysis to calibrate the constellation of antennas.

In still various other embodiments, the physical constraint mapping further includes performing a one-time calibration of the constellation of antennas in a predetermined configuration.

In still various other embodiments, the predetermined configuration includes a completely flat configuration.

In still various other embodiments, the completely flat configuration yields a coupling matrix defined by:

$$S_{mn}^{flat} = \frac{a_m D_m(\theta_{mn}^{flat}) a_n D_n(\theta_{nm}^{flat})}{|\vec{l}_{mn}^{flat}|} e^{-j(\phi_m + \phi_n + k|\vec{l}_{mn}^{flat}|)}, \text{ where}$$

$$\theta_{mn}^{flat} = \frac{\pi}{2},$$

when $m \neq n$, and the constellation of antennas are each identical which makes $D_n(\theta) = D_m(\theta) = D(\theta)$ for all m's and n's.

In still various other embodiments, the physical constraint mapping further includes simplifying the coupling matrix such that the coupling matrix is defined by:

$$S_{mn}^{flat} \cong \frac{a_m a_n D\left(\frac{\pi}{2}\right)^2}{|\overrightarrow{l_{mn}^{flat}}|} e^{-j\left(\phi_m + \phi_n + k|\overrightarrow{l_{mn}^{flat}}|\right)}.$$

In still various other embodiments, the physical constraint mapping further includes defining a normalized transfer function, H.

In still various other embodiments, the normalized transfer function is defined by:

$$H_{mn} = \frac{D(\theta_{mn})D(\theta_{nm})}{D\left(\frac{\pi}{2}\right)^2} \frac{|\overrightarrow{l_{mn}^{flat}}|}{|\overrightarrow{l_{mn}}|} e^{-jk\left(|\overrightarrow{l_{mn}}| - |\overrightarrow{l_{mn}^{flat}}|\right)}.$$

In still various other embodiments, the physical constraint mapping further includes assuming a constant curvature of the constellation of antennas.

In still various other embodiments, assuming a constant curvature makes the normalized transfer function defined by:

$$H_{mn} = \frac{D\left(|\overrightarrow{l_{mn}}|\right)^2}{D\left(|\overrightarrow{l_{mn}^{flat}}|\right)^2} \frac{|\overrightarrow{l_{mn}^{flat}}|}{|\overrightarrow{l_{mn}}|} e^{-jk\left(|\overrightarrow{l_{mn}}| - |\overrightarrow{l_{mn}^{flat}}|\right)}.$$

In still various other embodiments, the physical constraint mapping includes determining the polarity of the shape of the constellation of antennas.

In still various other embodiments, the polarity is defined by:

$$p = \text{sign}\left(\sum_{i \neq j}\left(\text{sign}|\overrightarrow{l_{mn}^{flat}}| - E_{mn}^1\right)\right),$$

where p=−1 indicates a convex shape and p=+1 indicates a concave shape.

In still various other embodiments, the physical constraint mapping further includes performing recursive wrap correction to calculate a corrected phase wrap matrix constraining utilizing the polarity.

In still various other embodiments, the physical constraint mapping further includes truncating a search space for Euclidean distance to a single one-wavelength range.

In still various other embodiments, truncating the search space includes solving the following equation: $|\overrightarrow{l_{mn}}| \in [R'_{mn}\lambda, (R'_{mn}+1)\lambda)$.

In still various other embodiments, truncating the search space results in an Euclidean distance of:

$$E_{mn}^3 = \left(\underset{|\overrightarrow{l_{mn}}| \in [R'_{mn}\lambda, (R'_{mn}+1)\lambda)}{\arg\min} \left|H_{mn}^{meas} - H_{mn}\left(|\overrightarrow{l_{mn}}|\right)\right|\right)^2.$$

In still various other embodiments, the constellation of antennas is part of a global antenna system and the computer system is further configured to use the current position of each of the antennas in the constellation of antennas to stitch together with a position of other antennas in the global antenna system for a global reconstruction of the global antenna system.

Various other embodiments are directed to a method of determining a current configuration of a phased array, the method including: providing a constellation of antennas configured to receive and transmit radiation towards a far field target, wherein each of the antennas senses incidental power from the transmitted radiation from the other antennas of the constellation of antennas; measuring the incidental power sensed by the each of the antennas; performing a physical constraint mapping of the constellation of antennas; and performing an array shape construction to determine the ideal position of each of the antennas based on the physical constraint mapping and the incidental power sensed by each of the antennas.

In various other embodiments, the method further includes utilizing the determined current position to determine antenna excitation configurations of the antennas.

In various other embodiments, the constellation of antennas is positioned on a flexible substrate.

In still various other embodiments, the flexible substrate is bendable to reposition the constellation of antennas into the ideal position of all the elements.

In still various other embodiments, the method further includes controlling the position of the constellation of antennas into the ideal position of all the elements.

In still various other embodiments, the physical constraint mapping utilizes the possible mutual angle, antenna distance, and/or local curvature of the constellation of antennas.

In still various other embodiments, performing the physical constraint mapping includes modeling the incidental power sensed by the each of the antennas into a raw mutual coupling matrix $S \in \mathbb{C}^{N \times N}$.

In still various other embodiments, the raw mutual coupling matrix is defined by:

$$S_{mn} = \frac{a_m D_m(\theta_{mn}) a_j D_n(\theta_{nm})}{|\overrightarrow{l_{mn}}|} e^{-j(\phi_m + \phi_n + k|\overrightarrow{l_{mn}}|)}; \text{ and}$$

$$\theta_{mn} = \cos^{-1}\left(\frac{\widehat{r_m} \cdot \overrightarrow{l_{mn}}}{|\overrightarrow{l_{mn}}|}\right),$$

where $a_m$ is the total fixed amplitude offset in antenna m, $D_m(\theta)$ is the directivity of antenna m for an angle θ relative to broadside, $\overrightarrow{l_{mn}}$ is the vector pointing from the phase center of antenna i to the phase center of antenna n, $\phi_m$ is the total fixed phase offset in antenna m, and $\widehat{r_m}$ is the unit vector normal to the surface of the array, that describes the orientation of antenna m.

In still various other embodiments, performing the physical constraint mapping further includes performing a one-time calibration of the constellation of antennas in a completely flat configuration.

In still various other embodiments, the completely flat configuration yields a coupling matrix defined by:

$$S_{mn}^{flat} = \frac{a_m D_m(\theta_{mn}^{flat}) a_n D_n(\theta_{nm}^{flat})}{|\overrightarrow{l_{mn}^{flat}}|} e^{-j\left(\phi_m + \phi_n + k|\overrightarrow{l_{mn}^{flat}}|\right)}$$

where $\theta_{mn}^{flat} = \frac{\pi}{2}$.

when m≠n, and the constellation of antennas are each identical which makes $D_n(\theta)=D_m(\theta)=D(\theta)$ for all m's and n's.

In still various other embodiments, performing the physical constraint mapping further includes simplifying the coupling matrix such that the coupling matrix is defined by:

$$S_{mn}^{flat} \cong \frac{a_m a_n D\left(\frac{\pi}{2}\right)^2}{|\overrightarrow{l_{mn}^{flat}}|} e^{-j\left(\phi_m+\phi_n+k|\overrightarrow{l_{mn}^{flat}}|\right)}.$$

In still various other embodiments, performing the physical constraint mapping further includes defining a normalized transfer function, H.

In still various other embodiments, the normalized transfer function is defined by:

$$H_{mn} = \frac{D(\theta_{mn})D(\theta_{nm})}{D\left(\frac{\pi}{2}\right)^2} \frac{|\overrightarrow{l_{mn}^{flat}}|}{|\overrightarrow{l_{mn}}|} e^{-jk\left(|\overrightarrow{l_{mn}}|-|\overrightarrow{l_{mn}^{flat}}|\right)}.$$

In still various other embodiments, performing the physical constraint mapping further includes assuming a constant curvature of the constellation of antennas.

In still various other embodiments, assuming a constant curvature makes the normalized transfer function defined by:

$$H_{mn} = \frac{D\left(|\overrightarrow{l_{mn}}|\right)^2}{D\left(|\overrightarrow{l_{mn}^{flat}}|\right)^2} \frac{|\overrightarrow{l_{mn}^{flat}}|}{|\overrightarrow{l_{mn}}|} e^{-jk\left(|\overrightarrow{l_{mn}}|-|\overrightarrow{l_{mn}^{flat}}|\right)}.$$

In still various other embodiments, performing the physical constraint mapping includes determining the polarity of the shape of the constellation of antennas.

In still various other embodiments, the polarity is defined by:

$$p = \text{sign}\left(\sum_{i \neq j}\left(\text{sign}|\overrightarrow{l_{mn}^{flat}}| - E_{mn}^1\right)\right),$$

where p=−1 indicates a convex shape and p=+1 indicates a concave shape.

In still various other embodiments, performing the physical constraint mapping further includes performing recursive wrap correction to calculate a corrected phase wrap matrix constraining utilizing the polarity.

In still various other embodiments, performing the physical constraint mapping further includes truncating a search space for Euclidean distance to a single one-wavelength range.

In still various other embodiments, truncating the search space includes solving the following equation: $|\overrightarrow{l_{mn}}| \in [R'_{mn}\lambda, (R'_{mn}+1)\lambda)$.

In still various other embodiments, truncating the search space results in an Euclidean distance of:

$$E_{mn}^3 = \left(\underset{|\overrightarrow{l_{mn}}| \in [R'_{mn}\lambda, (R'_{mn}+1)\lambda)}{\arg\min} \left|H_{mn}^{meas} - H_{mn}\left(|\overrightarrow{l_{mn}}|\right)\right|\right)^2.$$

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION

Figure 1:
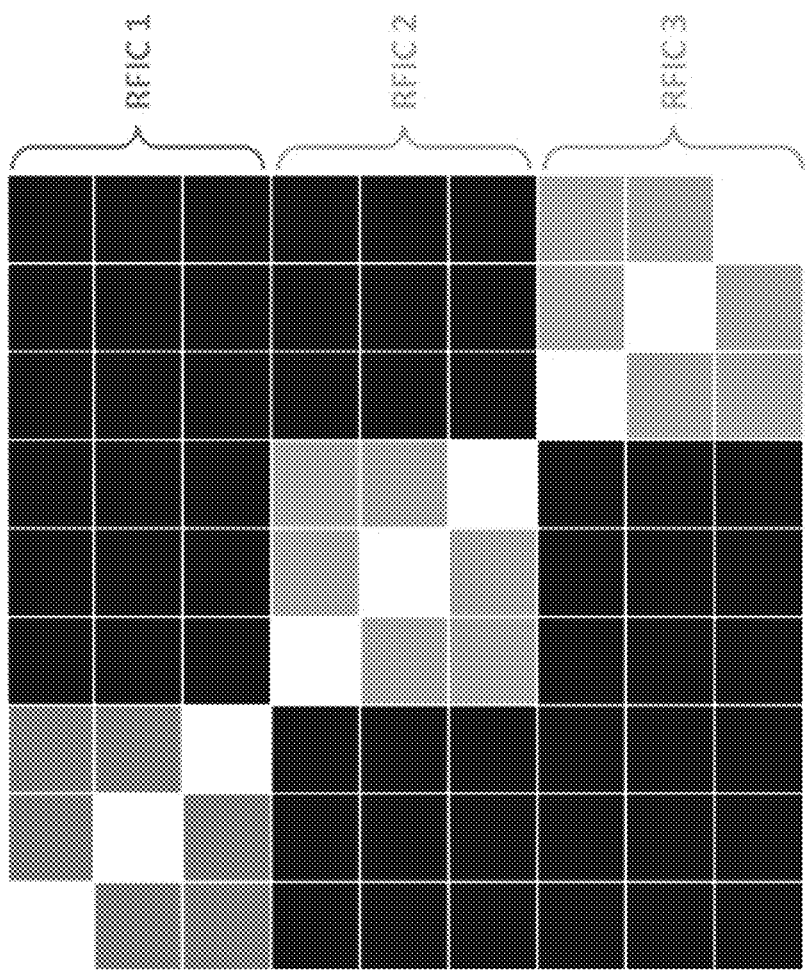
FIG. 1 is an example of an EDM produced by a decentralized flexible phased array in accordance with an embodiment of the invention.

Various embodiments of the invention relate to a reconfigurable phased array and a method for determining the ideal configuration of a phased array. Certain disclosed embodiments include a reconfigurable phased array including a constellation of antennas configured to receive and retransmit radiation towards a far field target. The constellation of antennas may be a passive or active phased array. The active phased arrays can be driven by bulk components or with integrated circuits (ICs). The shape of arrays driven by ICs can be reconstructed using the IC as the central node performing the mutual coupling measurements. If the IC has both RF and computing functionality, all reconstruction can be programmed onto a single die. Shape reconstruction can be used with many antenna variants. To implement a system with any of these, the directivity pattern and the applicable, specific electromagnetic behavior may be changed into the coupling model. Examples of antenna variants include: Flexible polyimide antenna(s); Flexible metal antenna(s); Dipole antenna(s); Flexible dipole antenna(s); Patch antenna(s); Flexible air-gap patch antenna(s); Circularly polarized antenna(s); Helical antenna(s); and/or Yagi-Uda antenna(s). The antennas may or may not include a ground plane. Further, the antennas may be mounted on a stretchable substrate or a foldable substrate which may be utilized to reposition each element into different configurations.

Each of the antennas senses incidental power from the transmitted radiation from the other antennas of the constellation of antennas. This incidental power may be referred to as mutual coupling. The reconfigurable phased array further includes a computer system configured to: measure the incidental power sensed by the each of the antennas; perform a physical constraint mapping of the constellation of antennas; perform an array shape construction to determine the ideal position of all the elements based on the physical constraint mapping of the constellation of antennas and the incidental power sensed by each of the antennas. The physical constraint mapping may be performed by a Spiral Match algorithm which is further discussed below.

As flexible arrays and high-dimensional antenna systems continue to develop in maturity and in utility, it may be advantageous to be able to calibrate their shape. These systems enable myriad applications, such as imaging, sensing, wireless power transfer, communication, etc. These applications may benefit from including a process that the array itself or some other device has some sense of the array shape so that complex operations (e.g. beam steering, wavefront shaping, computational imaging, etc.) can be performed. Various previous approaches rely on communication between each element in the array. In large, distributed systems, where two elements might be driven by different RFICs or by different clock lines, it is not always possible to perform shape calibration. Disclosed herein are methods for performing global shape reconstruction for distributed systems by stitching together many local shape measurements. These methods may enable a myriad new applications not previously addressed, including but not limited to shape calibration for very large, distributed array systems, flexible electronics, distributed arrays in a large network, or disconnected transceivers in an imaging, sensing, or communications system.

The disclosed shape reconstruction method utilizes a mutual coupling measurement to generate a physical constraint matrix that is transformed into shape information for utilization in beam steering, sensing, imaging, or a host of other applications. The underlying circuitry is equipped to take this coupling measurement. In some embodiments, the underlying circuitry is a radio frequency integrated circuit (RFIC) which contains all of the necessary functionality for normal operation, including Tx and Rx paths for full tranceiving functionality. When the chip receives a command to perform a mutual coupling measurement, it sets one (antenna) output to the transmitting path and another output to the receiving path. The outgoing (Tx) and incoming (Rx) waves are mixed down to baseband where they can be ported off-chip—perhaps to an application-specific integrated circuit (ASIC) or microcontroller analog-to-digital converter (ADC)—where they can be used for shape reconstruction.

This process prevents the measurement of mutual coupling between antennas that are driven by separate RFICs because the receiving and transmitting paths cannot be mixed. This sets a cap on the scope of a mutual coupling matrix for a large system that may be comprised of multiple RFICs. Such a system will be limited to producing a purely block-diagonal mutual coupling matrix which will, in turn, produce a purely block-diagonal physical constraint matrix. This makes it impossible to reconstruct the shape globally, and limits to only reconstructing the shape within the scope of a single RFIC. An illustration of this problem is given with the example of a purely block-diagonal matrix in FIG. 1. FIG. 1 is an example of an EDM produced by a decentralized flexible phased array in accordance with an embodiment of the invention. The decentralized flexible phased array includes 3 RFICs responsible for 3 antennas which each can only measure mutual coupling between themselves.

Large array systems rely on the distribution of RF control functionality (e.g. power generation, amplification, phase shifting, etc.) to multiple RFICs because of limitations of centralizing control over many outputs in a single RFIC. For example:

Power concerns: Generating the necessary power for hundreds of transceivers with reasonable SNR on a small area may concentrate tremendous heat that could degrade performance.

Line losses: A centralized chip may include routing to all the outputs, including comparatively longer high-frequency RF lines which introduce high resistive losses and reduces output power.

Chip size: A chip with hundreds of outputs presents a geometric challenge. The chip may have to be designed as a long strip to maximize the perimeter-to-area ratio so that the necessary output lines can be routed. Moreover, a routing problem may occur that may mitigate design freedom regarding antenna spacing and position.

Thus, successful global shape reconstruction of a large, distributed system includes methods that go beyond those presented previously.

Assumptions may be made about the curvature. Firstly, it is known because of the design of the array, the spacing between adjacent RFIC blocks. Thus, the problem of stitching multiple blocks together into a global shape converges to solving for the angles between adjacent blocks. Secondly, it may be assumed that the surface of the array is continuous (free of kinks or folds). It is known that—in some distance limit—the curvature is constant. If the spacing between adjacent RFIC "blocks" is small relative to the bend constraints placed by the array components, it can be assumed that the distant limit is on the order of the element spacing and, thus, that the curvature between blocks is constant. These constraints can be leveraged in a number of ways to turn locally reconstructed shapes into a global shape reconstruction.

Local shape reconstruction is defined as knowledge of the position of elements in an array cluster relative to other elements in that same array cluster. Relative position can be imagined as a vector from one element in the cluster to another element in the cluster:

$$r_{i,j}^k = r_j^k - r_i^k \quad (1)$$

where $r_{i,j}^k$ is the relative position vector and $r_j^k$ is the position of element j in cluster k. $j \in \{1, 2, \ldots, N_k\}$ where $N_k$ is the number of elements in cluster k. Local shape reconstruction provides the relative position vector, $r_{i,j}^k$, but not the absolute position vector, $r_j^k$. Local shape reconstruction, and by proxy the tuple of relative position vectors that constitute a result, $\{r_{i,j+1}^k | i \in \{1, 2, \ldots, N_k-1\}\}$, may be invariant under translation and rotation. Thus, performing global shape reconstruction between two clusters implies solving for two degrees of freedom: the position of the first element and the direction of the first relative position vector in the second block. A global shape may still retain the outstanding two degrees of freedom from the first cluster.

Figure 2:
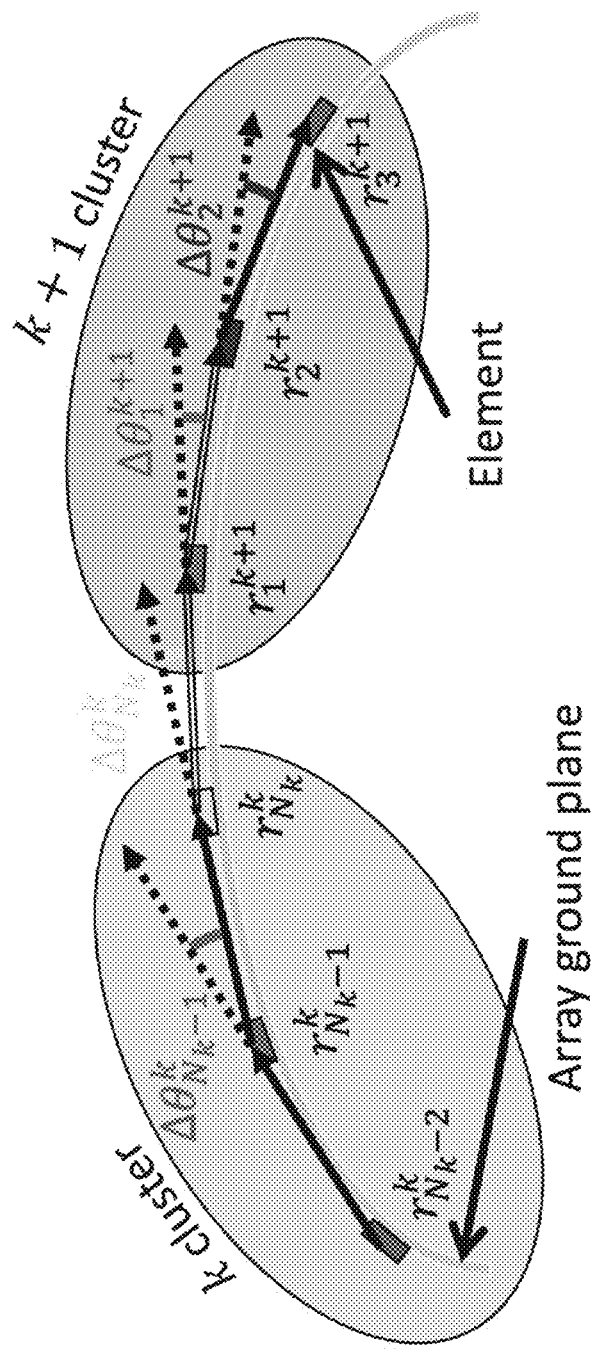
FIG. 2 is an illustration of the shape geometry at the intersection of two element clusters for Angle Stitching in accordance with an embodiment of the invention.

First, a 1D array may be provided with the potential to bend into shapes in two dimensions. This array may be composed of K clusters of N elements each, where—for example—element $r_N^k$ is adjacent to element $r_1^{k+1}$. A "cluster" may be defined as a grouping of elements driven by the same RFIC; local shape reconstruction gives us the shape of a cluster. Successful global shape reconstruction may be defined as knowledge of the shape of multiple clusters together. Said otherwise, it is the elimination of the degrees of freedom for all but the first cluster. Thus, the position of the first element and direction of the first relative position vector are defined relative to the position of elements in the previous cluster:

$$r^{k,k+1} = r_1^{k+1} - r_N^k \quad (2)$$

$$r^{k,k+1} = p^{k,k+1}(\cos(\theta^{k,k+1})\hat{x} + \sin(\theta^{k,k+1})\hat{y}) \quad (3)$$

$$r_{1,2}^{k+1} = p_{1,2}^{k+1}(\cos(\theta_{1,2}^{k+1})\hat{x} + \sin(\theta_{1,2}^{k+1})\hat{y}) \quad (4)$$

Where $p^{k,k+1}$ is the known, constant pitch between clusters k and k+1, $p_{1,2}^{k+1}$ is the known, constant pitch between elements 1 and 2 within cluster k+1, $\theta^{k,k+1}$ is the direction between the last element in cluster k and the first element in cluster k+1, and $\theta_{1,2}^{k+1}$ is the direction between the first two elements in cluster k+1. Thus, the two degrees of freedom—position and direction—of the second cluster are fixed, defined relative to the first cluster by $\theta^{k,k+1}$ and $\theta_{1,2}^{k+1}$. An intersection of these two clusters and the relevant variables are shown in FIG. 2. FIG. 2 is an illustration of the shape geometry at the intersection of two element clusters for Angle Stitching in accordance with an embodiment of the invention.

The problem of solving for global shape reconstruction may be defined as solving for the K−1 $\theta^{k,k+1}$'s and the K−1 $\theta_{1,2}^{k+1}$'s.

To do so, smoothness may be maximized using the assumption of constant curvature at the block intersections. Smoothness may be defined as continuity of the first derivative. The angle difference, $\Delta\theta_i^k$, may be used as a metric for smoothness:

$$\Delta\theta_i^k = \Delta\theta_{i,i+1}^k - \Delta\theta_{i-1,i}^k \quad (5)$$

Smoothness of shape implies that $\Delta\theta_i^k$ is constant in a small neighborhood about $r_i^k$ ($\Delta\theta_{i-1}^k \approx \Delta\theta_i^k \approx \Delta\theta_{i+1}^k$). Direction change at the edges can be defined as:

$$\Delta\theta_N^k = \theta^{k,k+1} - \Delta\theta_{N-1,N}^k \quad (6)$$

$$\Delta\theta_1^{k+1} = \theta_{1,2}^{k+1} - \theta^{k,k+1} \quad (7)$$

To maximize the smoothness of the resulting stitched shape, it may be desired that these two direction changes to be similar to their neighbors: $\Delta\theta_{N-1}^k$ and $\Delta\theta_2^{k+1}$. Thus, linearly interpolating may be used to estimate for the edge direction changes:

$$\Delta\theta_N^k = \frac{2\Delta\theta_{N-1}^k + \Delta\theta_2^{k+1}}{3} \quad (8)$$

$$\Delta\theta_1^{k+1} = \frac{\Delta\theta_{N-1}^k + 2\Delta\theta_2^{k+1}}{3} \quad (9)$$

These may be used to compute for the two unknown directions:

$$\theta^{k,k+1} = \theta_{N-1,N}^k + \Delta\theta_N^k \quad (10)$$

$$\theta_{1,2}^{k+1} = \theta^{k,k+1} + \Delta\theta_1^{k+1} \quad (11)$$

Having solved for the two unknown directions, the two degrees of freedom for cluster k+1 have been eliminated and, in doing so, successfully "stitched" clusters k and k+1 together. The positions of the first two elements in the k+1 cluster can be computed using (3) and (4). This process may be continued for each $k \in \{2, 3, \ldots, K\}$.

Antenna position may be used to obtain information about the shape of the array. The tangent vector, corresponding to a single element, i, may be given by:

$$t_i^k = r_{i+1}^k - r_{i-1}^k \quad (12)$$

Figure 3:
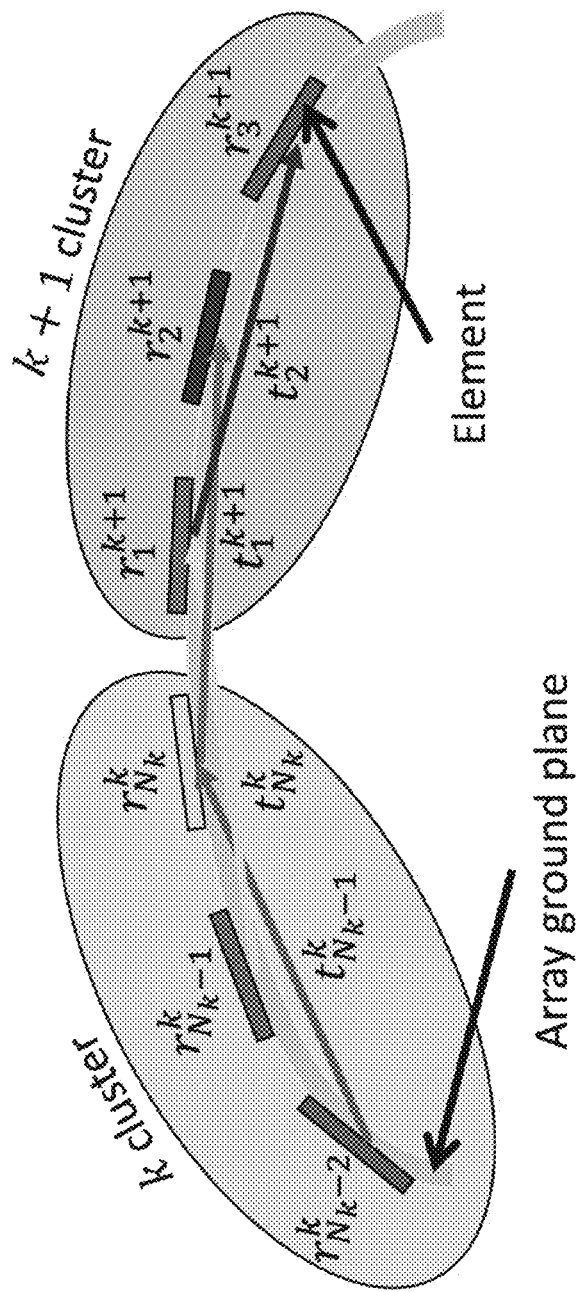
FIG. 3 is an illustration of the shape geometry at the intersection of two element clusters for Tangent Vector Stitching in accordance with an embodiment of the invention.

This formulation may be used to help stitch two clusters, k and k+1, each with $N_k$ and $N_{k+1}$ elements, together. To the first order, (2) sets the following conditions:

$$t_{N_k}^k = r_1^{k+1} - r_{N_k-1}^k \quad (13)$$

$$t_1^{k+1} = r_2^{k+1} - r_{N_k}^k \quad (14)$$

which relate the location of one cluster with respect to the next. As can be seen, two equations may completely define the two degrees of freedom for the k+1 cluster. This geometry is visualized in FIG. 3. FIG. 3 is an illustration of the shape geometry at the intersection of two element clusters for Tangent Vector Stitching in accordance with an embodiment of the invention.

To "stitch" both the position and the direction of the k+1 cluster to the k cluster, two positions may be solved for. The equations above may be utilized to solve for these two positions. Rearranged, it can be seen that:

$$r_1^{k+1} = r_{N_k-1}^k + t_{N_k}^k \tag{15}$$

$$r_2^{k+1} = r_{N_k}^k + t_1^{k+1} \tag{16}$$

$r_{N_{k-1}}^k$ and $r_{N_k}^k$ it may be solved for, but the edge tangent vectors $t_{N_k}^k$ and $t_1^{k+1}$ may still not be solved for. To solve for these, continuity of curvature is assumed within a cluster and the angle between successive tangent vectors is solved for to obtain a rough estimate of the curvature:

$$\theta_{N_k-2,N_k-1}^k = \cos^{-1}\left(\frac{t_{N_k-2}^k \cdot t_{N_k-1}^k}{|t_{N_k-2}^k||t_{N_k-1}^k|}\right) \tag{17}$$

$$\theta_{2,3}^{k+1} = \cos^{-1}\left(\frac{t_2^{k+1} \cdot t_3^{k+1}}{|t_2^{k+1}||t_3^{k+1}|}\right) \tag{18}$$

Thus, the edge tangent vectors is solved for by rotating their neighboring tangent vectors:

$$t_{N_k}^k = R_{\theta_{N_k-2,N_k-1}^k}(t_{N_k-1}^k) \tag{19}$$

$$t_1^{k+1} = R_{-\theta_{2,3}^{k+1}}(t_2^{k+1}) \tag{20}$$

where $R_\theta(t)$ is an operator on tangent vector k which induces a rotation of θ about the origin. Thus, two adjacent antenna clusters have been stitched together. This process can continue for k+2, k+3, . . . until all clusters have been stitched together.

There is the possibility of error propagation through this process, given that each successive stitching iteration depends on the last and all position vectors are based on measurements that are error-prone. Without additional physical constraints (e.g. the ends are fixed, the shape cannot bend beyond a limit, etc.) it is difficult to prevent or anticipate this. However, if there is a system constraint that can be optimized for, error can be accounted for and minimized.

In order to calculate the error in Angle Stitching, the final expression may be refined for the two unknown directions, including the possibility of measurement noise or error:

$$\theta^{k,k+1} = \theta_{N-1,N}^k + \Delta\theta_N^k + \delta\theta_1^k \tag{21}$$

$$\theta_{1,2}^{k+1} = \theta^{k,k+1} + \Delta\theta_1^{k+1} + \delta\eta_2^k \tag{22}$$

where $\delta\theta_1^k$ and $\delta\theta_2^k$ are (small) measurement error parameters for the $k^{th}$ stitching iteration.

Consider a system where the first element $r_1^1$ may be adjacent to the last element $r_{N_k}^K$. This has two implications. Firstly, an additional stitching iteration may provide two more equations for $\theta^{K,1}$ and $\theta_{1,2}^1$. Secondly, measurement noise or error may be detected if this constraint is not met. To ensure this constraint is met, the optimization process below may be followed:

$$\text{Minimize}: L = \sqrt[\gamma]{\sum_{k=1}^K \sum_{i=1}^2 (\delta\theta_i^k)^\gamma}$$

Subject to: $|r_{N_K}^K - r_1^1| = p^{K,1}$ in addition to the constraints posed by the stitching process for the previous K−1 clusters. L, the loss function, a generalization of an l-norm, may be minimized where a high norm order, γ, penalizes kinks (or large angle error concentrated in a single stitch) in the global shape.

Similar to angle stitching, error in the position vectors propagates through the process and prevents a physical constraint from being met, if there is one. Invoking the same example as above, if the array is a loop, there is a possibility that the final (K) cluster may not correctly stitch to the original cluster. To correct for this, the above equations may be generalized to account for small errors:

$$t_{N_k}^k = R_{\theta_{6,7}^k + \delta\theta_1^k}(t_{N_k}^k - 1) \tag{23}$$

$$t_1^{k+1} = R_{-(\theta_{2,3}^{k+1} + \delta\theta_2^k)}(t_2^{k+1}) \tag{24}$$

where $\delta\theta_1^k$ and $\delta\theta_2^k$ are the same error parameters for the $k^{th}$ stitching iteration as above. Error may be minimized and the physical constraint may be met using the same loss function and optimization process as above. Optimization can be performed using gradient descent, or a number of other optimization processes suited for high dimensional minimizations.

The discussed algorithm may be utilized in flexible phased arrays. In fact, disclosed herein is a framework for reconstructing the shape of flexible phased arrays based on mutual coupling measurements among elements. This autonomous shape reconstruction may be implemented in two steps: first, a Spiral Match algorithm and second, a semidefinite programming solution. Both steps can be replaced with other algorithms, enabling a level of modularity that may make this framework both flexible and more accurate for particular systems. Below, the accuracy of this approach is demonstrated on two 2.5 GHz passive phased arrays, one with a dipole and another with a patch antenna. This framework is also demonstrated on a flexible RFIC phased array. The accuracy achieved in the integrated circuit array reconstruction was ≈6% of one wavelength. This result enables sufficiently accurate for calibration free, real-time beamforming, beamsteering, or focusing arrays. This is included but not limited to highelement arrays, strongly asymmetric shapes, stretchable arrays, 2D arrays, and large distributed systems. Mutual coupling measurements may also be sufficient for reconstructing array shape.

Figure 4:
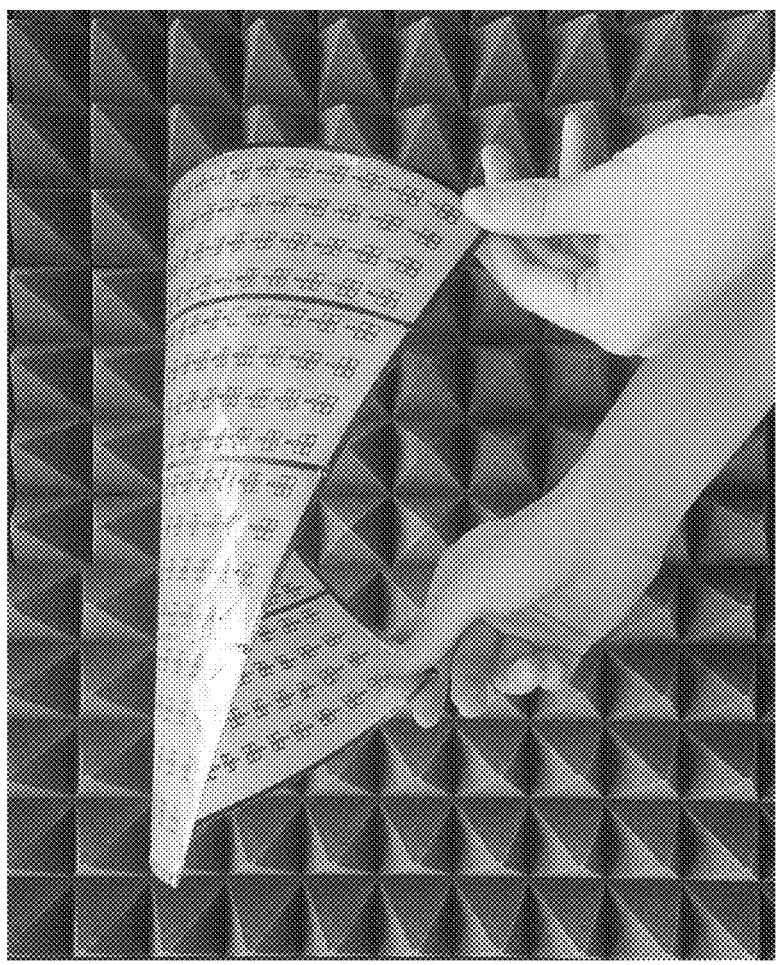
FIG. 4 is an image of an example of a flexible phased array.

Turning to the figures, FIG. 4 is an image of an example of a flexible phased array. The flexible phased array may be a 2D flexible phased array antenna sheet with 256 10 GHz patch antennas. The flexible arrays may be bendable to reposition the antennas within the array antenna sheet. Flexible arrays may operate while curling with biological and mechanical joints or while fluttering in the wind if fast and accurate array shape reconstruction can be achieved. In other systems, an array that can accurately reconstruct its own shape may be used as a sensor itself in applications involving gaming, haptic human-machine interfaces, biomedical sensing, etc. Shape reconstruction may be significantly more general than shape calibration, instances of which have been shown in the past. Shape calibration refers to adjustments of element excitation phases to account for changes in relative element position and orientation within the array. Without shape calibration, the beam-forming, beam-steering, beam-focusing, arbitrary wavefront generation, and interference suppression capabilities of a flexible phased array may quickly disappear. These additional sensors increase system complexity by incorporating a new sensing domain and utilizing hardware not already present in phased array systems. Additionally, each resistive strain sensor only offers a single measurement value. For an array with complex bending geometry (having high sinuosity or lacking bilateral symmetry), a single, localized measurement will not accurately capture array shape. Designing a flexible phased array with a limited number of ancillary sensors may benefit from knowledge of the expected space of curvatures the array surface will experience during design, limiting the applications of such an array.

Superseding prior calibration approaches, shape reconstruction may be a more complete and more difficult task: full determination of the shape of the array and the surface to which it is conformed. Various embodiments of this disclosure include systems and methods for performing shape reconstruction only from local measurements of mutual coupling between elements in a flexible phased array. While phased arrays may be designed to direct an electronically steerable beam of microwave power towards a far-field target, some fraction of the power radiated by one element in the array may be absorbed by the other elements. This incidental power transmission may be referred to as mutual coupling. While in extreme cases it may be detrimental to array performance, mutual coupling provides information about the state of elements within the array. Mutual coupling shape reconstruction transposes the problem: using mutual coupling measurements to determine relative position of elements in the array.

Mutual coupling measurements may contain sufficient information for array shape reconstruction but an analytical and algorithmic framework may be utilized to turn an inter-element coupling matrix into element positions. In some embodiments, a two-step, modular framework may be utilized which is adaptable to different algorithmic approaches accounting for different sets of antenna properties and physical constraints. Some embodiments may be three different arrays instead of only one.

The framework may be successfully utilized on two different passive arrays with different radiators. To demonstrate a realistic system-level implementation of such algorithms, an active 10 GHz array using monolithic radio frequency integrated circuits (RFICs) may be utilized. RFICs provide timing synchronization, frequency synthesis, signal amplification, digitization, and a multitude of digital control functions with a millimeter-scale footprint. With this density of complex functions, discrete components can be removed, avoiding their bulk and rigidity which may be prohibitive for a truly flexible design. The integrated circuit-based flexible phased array is described below.

Figure 5:
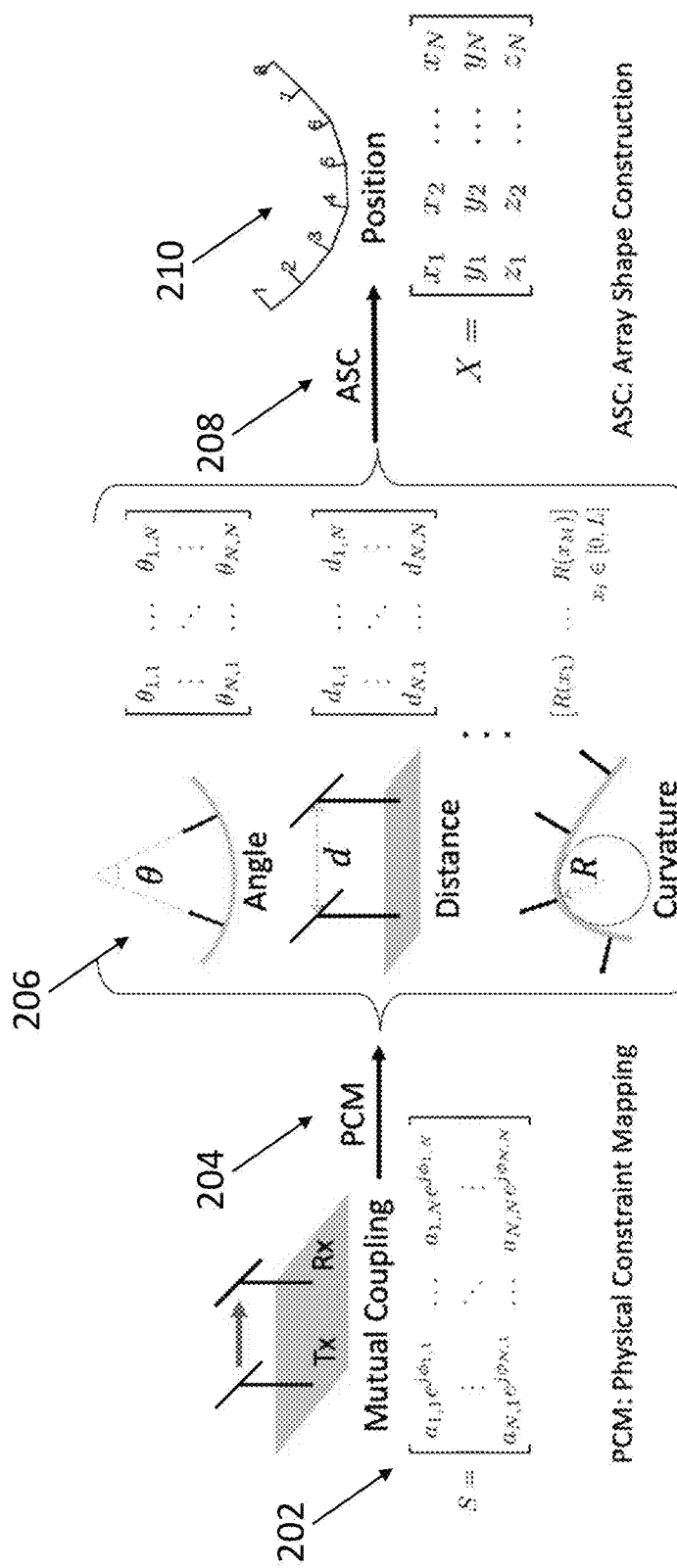
FIG. 5 illustrates a block diagram of a modular framework for mutual coupling-based shape reconstruction in accordance with an embodiment of the invention.

FIG. 5 illustrates a block diagram of a modular framework for mutual coupling-based shape reconstruction in accordance with an embodiment of the invention. The framework begins with mutual coupling data represented as a matrix 202. A first step may include applying a physical constraint mapping (PCM) 204 which processes the mutual coupling information to produce physical constraints 206 of the array shape, such as element distances, mutual angles, or local curvatures. These physical constraints 206 can be represented in different formats (matrix, etc.), but all contain the necessary information to reconstruct the shape. A second step may include array shape construction (ASC) 208, utilizes the physical constraints 206 to generate the actual positions 210 of all elements and, thus the array shape. The actual positions 210 of all the elements may be used to determine antenna excitation configurations of the elements.

This disclosure includes specific embodiments of the PCM and ASC algorithms. A mutual coupling matrix $S \in \mathbb{C}^{N \times N}$ may be a physical constraint matrix $B \in \mathbb{R}^{N \times N}$, and a position matrix $X \in \mathbb{R}^{d \times N}$, where N denotes the number of array elements and d denotes the number of physical dimensions expected in the array (e.g. $d \in \{1,2,3\}$). In some embodiments, flexible phased arrays may include a single row of N=8 elements that only include d=2 dimensions. In some embodiments, the flexible phased array may include arbitrary N number of elements in d=3 dimensions.

The choice of algorithm for PCM and ASC may be dependent on the primary physical constraint used (e.g., relative distances or curvatures). The freedom to choose B gives this framework much of its modularity; different physical constraints may be better suited for different antenna systems. In some embodiments, Euclidean distance matrices (EDMs) may be utilized for the physical constraint matrix.

A Euclidean distance matrix, $E \in \mathbb{R}^{N \times N}$ may be defined as:

$$E_{mn} = |\sim r_m - \sim r_n|^2 \qquad (25)$$

where $\sim r_n$ ($n \in \{1, 2, \ldots, N\}$) is the position vector associated with point n. The matrix describes the squared distance between points in a d-dimensional point cloud. EDMs may be apt candidates for B because the EDMs can use known relationships between coupling and distance to devise the PCM algorithm and use existing algorithms for determining position from relative distance.

As discussed below, distance impacts both the phase and power of mutual coupling measurements. In some embodiments, a Spiral Match algorithm, may be utilized for PCM. Moreover, the problem of solving for the relative positions of an arbitrary number of points in an arbitrary number of dimensions may provide an EDM, E, which may be utilized in a number of applications. In some embodiments, a semi-definite optimization may be used to solve for the relative position.

Mutual Coupling Model

Accurate mapping of coupling measurements to physical parameters of the array (PCM in FIG. 5) may be used for proper shape reconstruction. The PCM algorithm may include a Spiral Match algorithm (discussed below) and maps the measured complex-valued coupling to a distance between the phase centers of the elements. Near and far-field electromagnetic interactions among the elements and with the environment may produce a rich and non-trivial behavior for the mutual coupling. Reactive fields, occlusion (e.g. blocked line of sight), surface waves, and multipath reflections off the ground plane, other elements, and nearby objects, may affect the observed coupling between elements. Exact modeling of these effects may be challenging in simple, ideal scenarios and may be impractical if not impossible in the continuously changing context of a flexible phased array. These effects may be second order in many intra-array coupling scenarios, where a far-field-like propagation mode dominates. Instead of an electromagnetically complete coupling model, a simplified model may be created with sufficient accuracy for shape reconstruction and adaptability for use with a variety of element radiator types.

The Spiral Match algorithm may be used to match the measured coupling to distance using far-field properties of the element antennas as the individual antenna properties can be easily measured and are relatively insensitive to array shape. The Spiral Match algorithm may start by approximating the coupling between antennas i and j in terms of the electric field of a far-field propagating plane wave, e.g., $$S(|\vec{l}_{mn}|) \approx \frac{A}{|\vec{l}_{mn}|} e^{-j(\omega t + k|\vec{l}_{mn}|)} \quad (26)$$

where $|\vec{l}_{mn}|$ is the linear distance between antennas m and n, k is the wave number, $\omega$ is the angular frequency, and A is an arbitrary amplitude scaling factor. It may be assumed that phase grows linearly with distance between antennas ($|\vec{l}_{mn}|$) and the coupled power falls off as $$\frac{1}{|\vec{l}_{mn}|^2}.$$

Figure 6A:
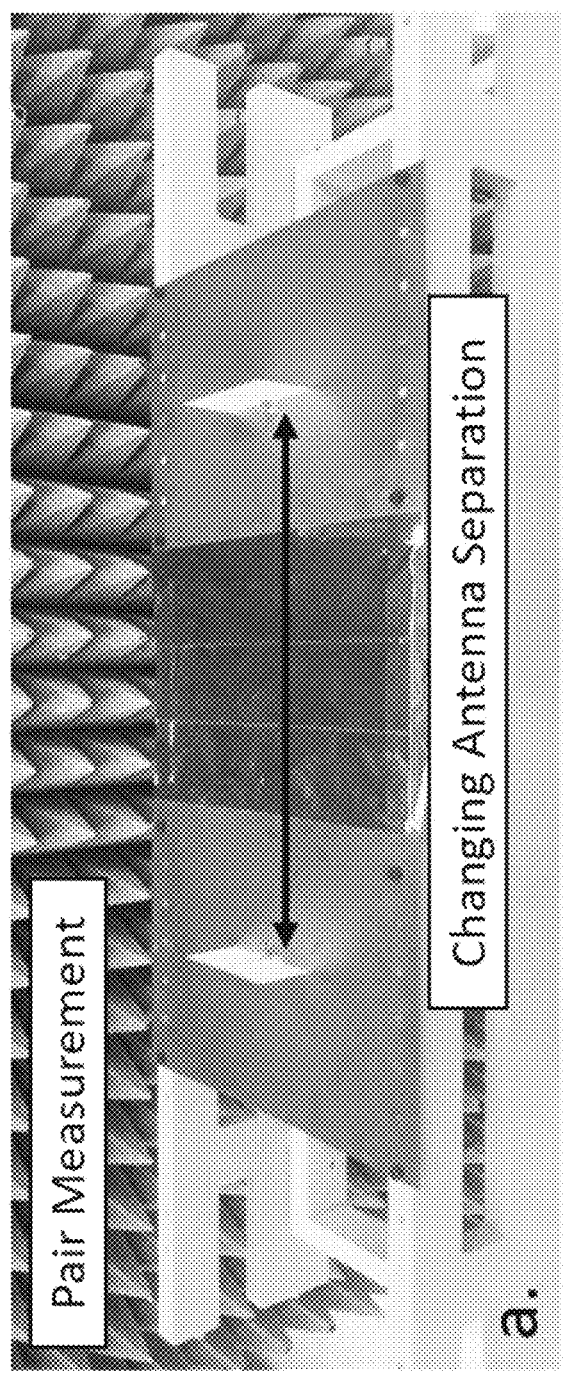
FIG. 6A is an image of an antenna pair coupling set-up.
Figure 6B:
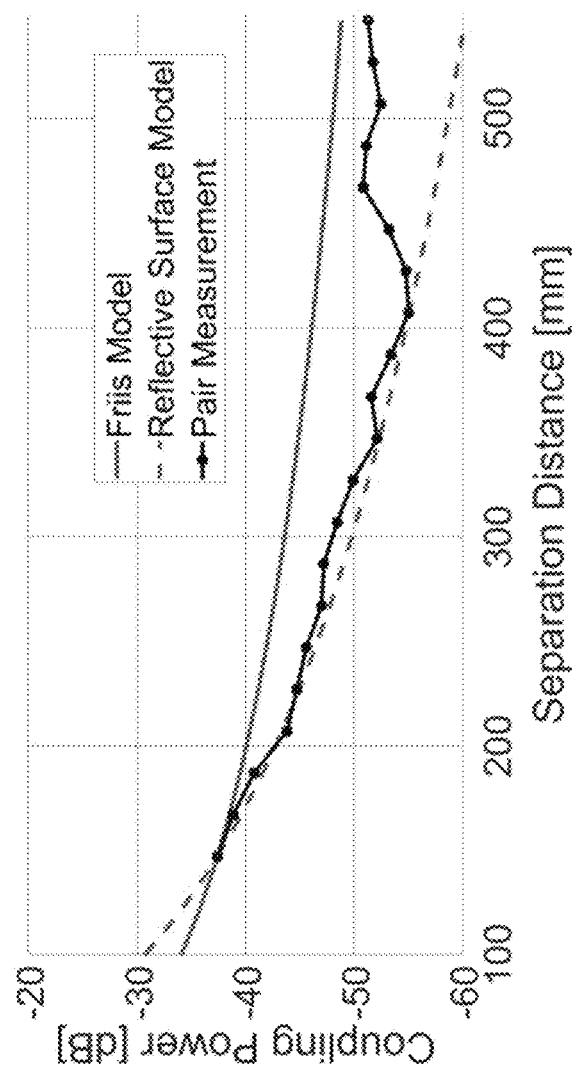
FIG. 6B is a plot of a coupling power measurement compared with two different propagation models
Figure 6C:
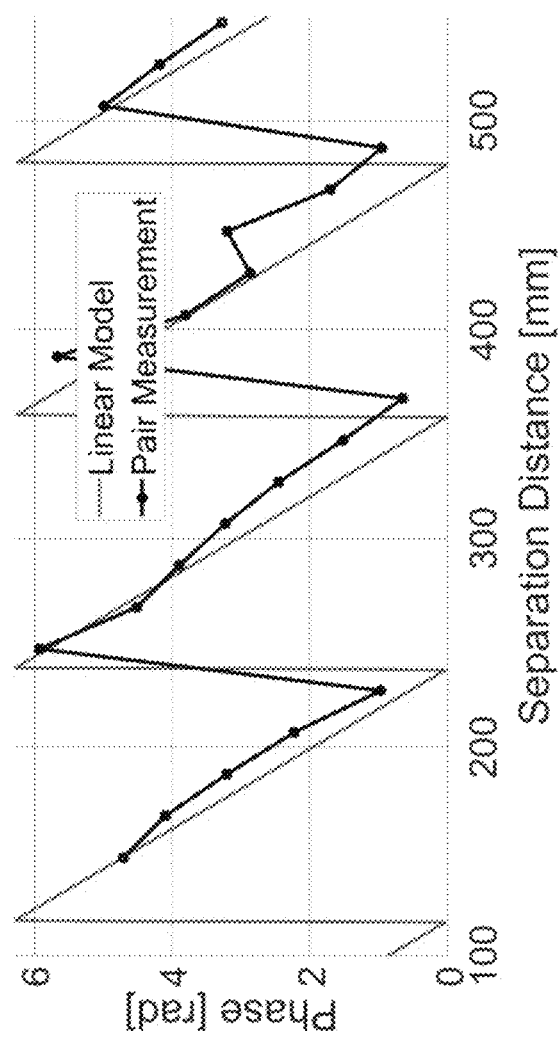
FIG. 6C is a plot of a coupling phase measurement.

To evaluate this approximation, a simple study may be performed with two 2.5 GHz ground plane backed folded dipole antennas (described below). FIG. 6A is an image of an antenna pair coupling set-up. Continuous ground plane may be maintained for all antenna distances. FIG. 6B is a plot of a coupling power measurement compared with two different propagation models. Measurement may be averaged over the bandwidth from 2.3 to 2.7 GHz. FIG. 6C is a plot of a coupling phase measurement. Antenna pair measurements may be compared with a far-field linear phase propagation model. The measurement may be at 2.48 GHz. In both the power plot and phase plot, linear model traces may be normalized to the first measured distance. The coupling between dipole antennas may be measured vs. their distance, as shown in FIG. 6A. The ground plane may be modified to maintain continuity at all distances. The coupling power and phase may be plotted in FIGS. 6B and 6C. The measured coupling power may be accompanied by two trendlines: the first follows the Friis $$\frac{1}{|\vec{l}_{mn}|^2}$$

trend, the second following a $$\frac{1}{|\vec{l}_{mn}|^4}$$

trend. This $$\frac{1}{|\vec{l}_{mn}|^4}$$

trend may be observed for communications systems with signals travelling long distances over an infinite conductive or lossy surface (e.g. the earth). For close distances, the measured coupling follows the $$\frac{1}{|\vec{l}_{mn}|^4}$$

trend as the ground plane approximates an infinite conductive surface. However, as the distance between antennas increases, the infinite surface approximation no longer holds as the ground plane may become relatively narrow and the measured coupling returns to the $$\frac{1}{|\vec{l}_{mn}|^2}$$

trend. This change is the distance exponent has a relatively small effect on the final shape reconstruction accuracy but emerges from a known, measurable phenomenon and can be incorporated into Spiral Match for a given array without much added modelling complexity.

Figure 7A:
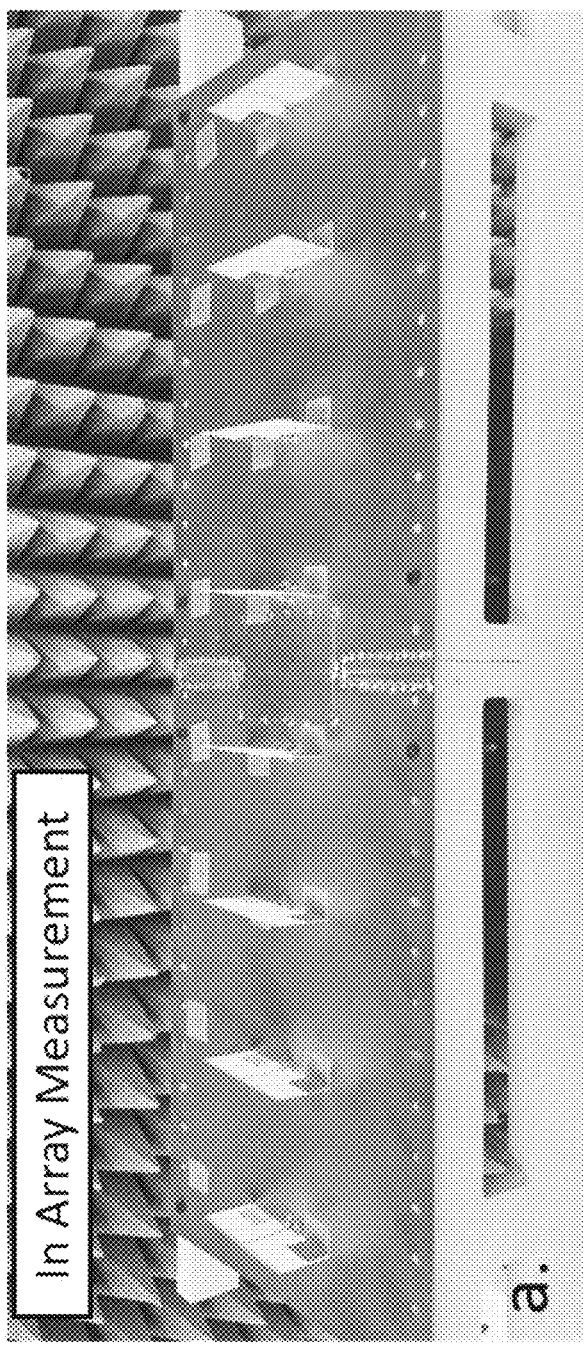
FIG. 7A is an image of a ground plane backed dipole array.
Figure 7B:
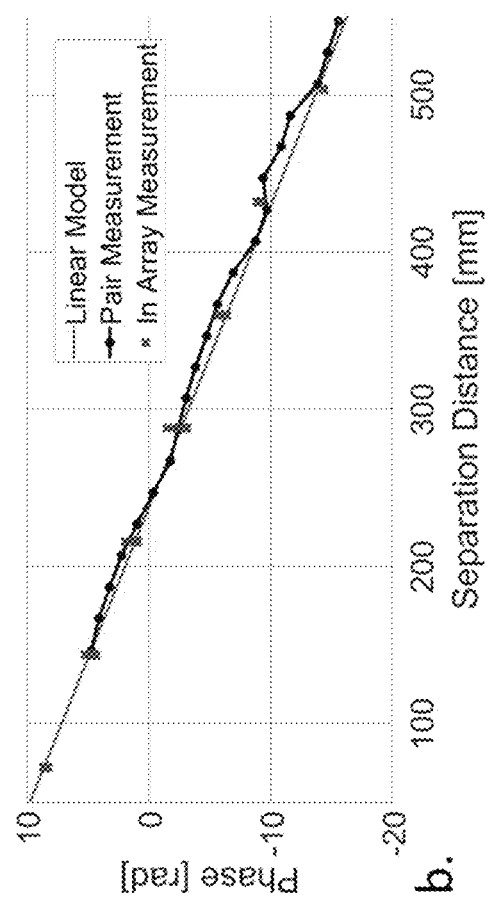
FIG. 7B is an unwrapped coupling phase measurement plot.

The coupling phase measurements roughly follow the linear trend predicted by the expression for a far-field propagating wave. FIG. 7A is an image of a ground plane backed dipole array. FIG. 7B is an unwrapped coupling phase measurement plot. In array measured phased may be compared to antenna pair measurements and far-field linear phase propagation model. The measurement may be performed at 2.48 GHz. Traces may be normalized to the first pair measurement distance. FIG. 7B compares the pair measurement results to the coupling measurements between elements in a flat, 8 element 1D array of the same folded dipoles with pitch of 72 mm. Since the element pitch is fixed, in-array phase measurements only exist at multiples of 72 mm. These measurements also follow the linear model suggesting that the presence of other elements in the array does not significantly disturb the phase of the propagation.

In the embodiments described in connection with FIGS. 6A-6C, the elements experience relative position changes but no relative rotation. However, when a flexible phased array is bent, its elements experience changes in both position and orientation. To account for the change in coupling due to this rotation various embodiments include the far-field radiation pattern of the element antennas. Element radiation patterns can be determined through analysis, simulation, or measurement.

Although far-field phase propagation and radiation pattern are imperfect models of the coupling between elements within a phased array, they can be used to produce accurate shape reconstructions.

Embodiments Including Spiral Match Algorithm

A Spiral Match algorithm may be utilized in the PCM. A Spiral Match algorithm may include the spiral shape generated in a polar plot of the decaying amplitude and rotating phase vs. distance of propagating waves.

A bijection (e.g., a one-to-one correspondence) between mutual coupling and distance may be generated. A first step includes modeling the raw mutual coupling matrix $S \in \mathbb{C}^{N \times N}$ for a 1-dimensional phased array as:

$$S_{mn} = \frac{a_m D_m(\theta_{mn}) a_j D_n(\theta_{nm})}{|\vec{l}_{mn}|} e^{-j(\phi_m + \phi_n + k|\vec{l}_{mn}|)} \quad (27)$$

$$\theta_{mn} = \cos^{-1}\left(\frac{\hat{r}_m \cdot \vec{l}_{mn}}{|\vec{l}_{mn}|}\right) \quad (28)$$

where $a_m$ is the total fixed amplitude offset (due to line attenuation, mismatch, gain, etc.) in antenna m, $D_m(\theta)$ is the directivity of antenna m for an angle $\theta$ relative to broadside, $\vec{l}_{mn}$ is the vector pointing from the phase center of antenna i to the phase center of antenna n, $\phi_m$ is the total fixed phase offset in antenna m, and $\vec{r}_m$ is the unit vector normal to the surface of the array, that describes the orientation of antenna m. The model for a 2-dimensional phased array may be very similar, and may involve only changing the directivity function to a function of two variables (e.g., $D_i(\theta_{mn}, \phi_{mn})$), the azimuth and elevation angles between elements m and n. $D_m(\theta=0)=1$ may be used for all m's. No significant angle-dependence may be present for the phase response of the antenna. In some embodiments, in Equation 27, the term $k|\vec{l}_{mn}|$ may be $|\vec{l}_{mn}|^k$ where k is between 1 and 2.

There are amplitude and phase offset terms that can prevent a bijection between coupling and distance. To isolate the distance terms, a one-time calibration of the array may be performed in the completely flat configuration. The information gathered during this measurement is another coupling matrix, $S^{flat}$:

$$S^{flat}_{mn} = \frac{a_m D_m(\theta^{flat}_{mn}) a_n D_n(\theta^{flat}_{nm})}{|\vec{l}^{flat}_{mn}|} e^{-j\left(\phi_m + \phi_n + k|\vec{l}^{flat}_{mn}|\right)} \quad (29)$$

Because the geometry of the flat configuration is fixed and known, basic assumptions can be made to simplify the model for flat coupling. First, in a flat array $$\theta^{flat}_{mn} = \frac{\pi}{2},$$

when m≠n. Moreover, assuming our array is composed of identical antennas, $D_n(\theta)=D_m(\theta)=D(\theta)$ for all m's and n's. Thus, we can simplify our flat coupling model to:

$$S^{flat}_{mn} \cong \frac{a_m a_n D\left(\frac{\pi}{2}\right)^2}{|\vec{l}^{flat}_{mn}|} e^{-j\left(\phi_m + \phi_n + k|\vec{l}^{flat}_{mn}|\right)} \quad (30)$$

Moreover, $|\vec{l}^{flat}_{mn}|$ may be known in advance. To eliminate the fixed power and phase offsets, the normalized transfer function, H may be defined:

$$H_{mn} \equiv \frac{S_{mn}}{S^{flat}_{mn}} \quad (31)$$

$$H_{mn} = \frac{D(\theta_{mn})D(\theta_{nm})}{D\left(\frac{\pi}{2}\right)^2} \frac{|\vec{l}^{flat}_{mn}|}{|\vec{l}_{mn}|} e^{-jk\left(|\vec{l}_{mn}| - |\vec{l}^{flat}_{mn}|\right)} \quad (32)$$

The dependence of the transfer function, H, on the angle matrix, θ presents a complication. Angles $\theta_{mn}$ and θd are two additional degrees of freedom, theoretically independent of $|\vec{l}_{mn}|$, that present a challenge to finding a bijection between coupling and distance. In the case of two mechanically detached radiators, each of the three variables $|\vec{l}_{mn}|$, $\theta_{mn}$, and $\theta_{nm}$ can induce changes in the coupling independently.

Figure 8:
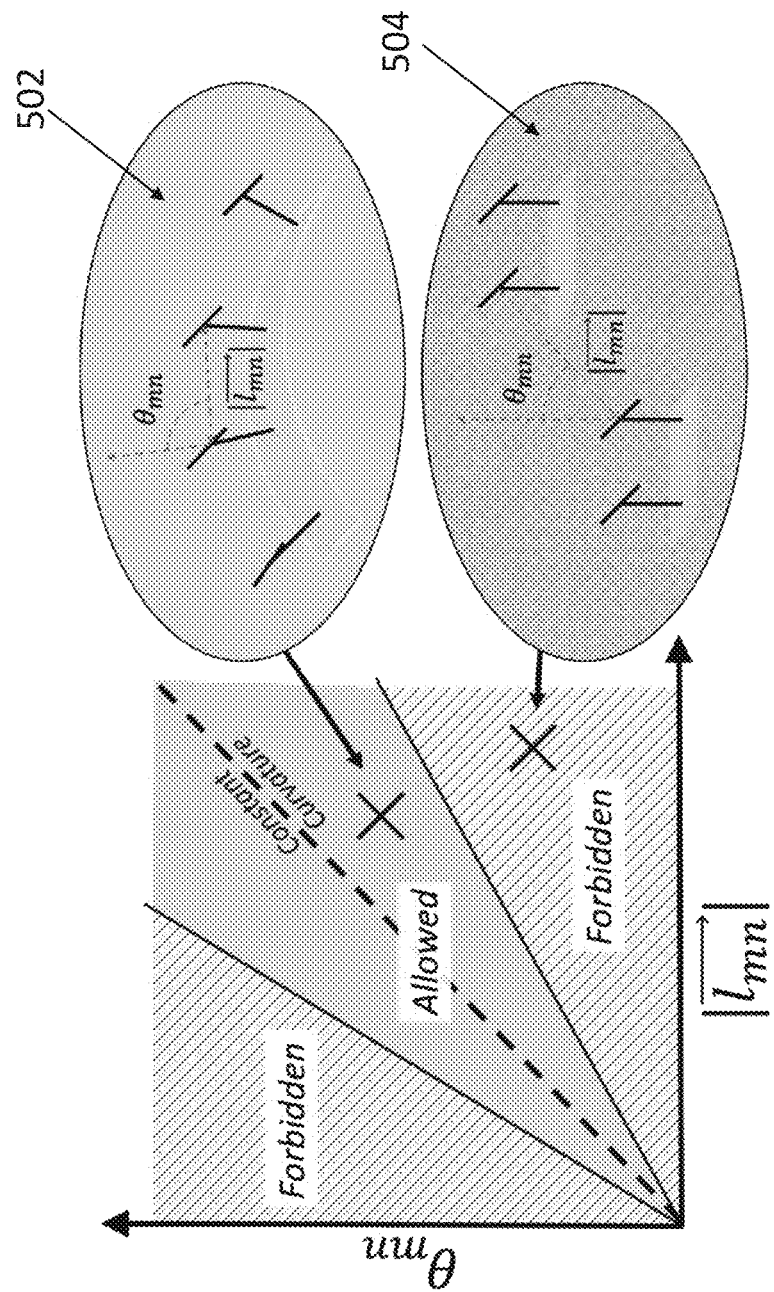
FIG. 8 is a visualization of forbidden and allowed regions of the $\theta_{mn} \otimes |\overrightarrow{l_{mn}}|$ vector space for physically restricted phase arrays.

However, because the radiators may be fixed to a non-stretchable ground plane, mechanical constraints in this system reduce the allowable space of parameters from all of $\mathbb{R}^3$ to a smaller subspace in $\mathbb{R}^3$. Even a stretchable ground plane places restrictions on antenna mobility and introduces a mechanical constraint that reduces the allowable space of independent variables, though to a lesser degree. To illustrate this, a special two dimensional case of only $|\vec{l}_{mn}|$ and $\theta_{mn}$ may be utilized; the mechanical constraint has the effect of partitioning $\mathbb{R}^2$ into "forbidden" and "allowed" subspaces, where pairs of $\{|\vec{l}_{mn}|, \theta_{mn}\}$ in the "forbidden" subspace are incompatible with the mechanical constraint, as illustrated in FIG. 8. FIG. 8 is a visualization of forbidden and allowed regions of the $\theta_{mn} \otimes |\vec{l}_{mn}|$ vector space for physically restricted phase arrays. The "constant curvature" line is shown in dashed blue in the center of the allowed region. An example of a shape that generates an allowed $\{\theta_{mn}, |\vec{l}_{mn}|\}$ pair 502 and a forbidden $\{\theta_{mn}, |\vec{l}_{mn}|\}$ pair 504. The forbidden $\{\theta_{mn}, |\vec{l}_{mn}|\}$ pair 504 can only be generated if the array is cut in half. The "allowed" pairs occupies a subspace in the shape of a triangular wedge: for some distances, the angular freedom may be highly restricted and for other distances, the angular freedom is large. Two caveats about the exact visualization presented: 1) This plot looks different for different antenna pairs and is characterized by $|\vec{l}^{flat}_{mn}|$. 2) The exact appearance in FIG. 8 may be inaccurate: The allowed region may not grow positively with increasing distance. The constant curvature assumption may not be a line. The space may not be symmetric.

There are multiple methods of dealing with the problem of optimizing over a high dimensional space while respecting the mechanical constraints at play. One is to computationally simulate the array and generate the $\{|\vec{l}_{mn}|, \theta_{mn}, \theta_{nm}\}$ triplets through brute force. Another is to characterize this subspace analytically. Finally, subspace may be assumed to be very thin, and treated as a line. This third option is equivalent to assuming the array ground plane only takes on shapes of constant curvature. The general framework may not depend on this assumption and implementations of the first two options are possible. In most practical cases where the surface bends smoothly without sharp kinks, the local curvature in a small neighborhood of several adjacent antennas can be considered constant. The general framework may be applied locally even for non-constant curvature cases.

Furthermore, the signal-to-noise ratio (SNR) of measurements between elements that are far apart, with many intervening elements, may be lower than elements within a smaller neighborhood (e.g. due to occlusion, reflections, attenuation, etc.) and may not contribute a great deal to the overall quality of the shape reconstruction. This does not preclude an ability to reconstruct the shape of phased array systems with large numbers of elements. The algorithm may only measure and model local measurements which can each have a different curvature. Although for each small neighborhood of antennas, a constant local curvature may be assumed, the curvature for an adjacent (and possibly overlapping set) can be different, leaving open the possibility for a shape with varying curvature. As discussed below, coupling measurements between far apart elements have a diminishing impact on shape reconstruction and, thus, it may not be important on how they are modeled.

Using the constant local curvature assumption, the space of independent variables may be reduced to $R^1$ and a bijection between $\theta_{mn}$ and $|\vec{l}_{mn}|$ may be achieved. The angle-dependent directivity, D ($\theta_{mn}(|\vec{l}_{mn}|)$) may be replaced with a distance-dependent directivity, $D(|\vec{l}_{mn}|)$. This simplifies the transfer function model to:

$$H_{mn} = \frac{D(|\vec{l}_{mn}|)^2}{D(|\vec{l}_{mn}^{flat}|)^2} \frac{|\vec{l}_{mn}^{flat}|}{|\vec{l}_{mn}|} e^{-jk(|\vec{l}_{mn}|-|\vec{l}_{mn}^{flat}|)} \quad (33)$$

Figure 9:
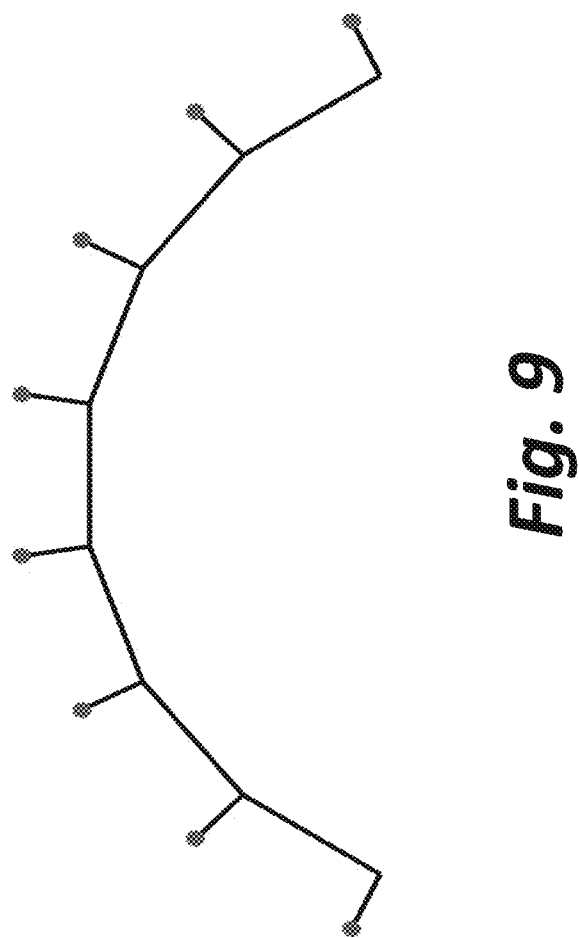
FIG. 9 shows a 2.5 GHz flexible phased array with 0.6λ antenna spacing and dipoles antennas that extend 0.25λ normal to the local ground plane in accordance with an embodiment of the invention.

The relationship between $\theta_{mn}$ and $|\vec{l}_{mn}|$ may be determined computationally. A geometric modeling of the array may be achieved. An example of the array model with a constant radius of curvature is illustrated in FIG. 9. FIG. 9 shows a 2.5 GHz flexible phased array with $0.6\lambda$ antenna spacing and dipoles antennas that extend $0.25\lambda$ normal to the local ground plane in accordance with an embodiment of the invention. The flexible phased array has a constant curvature, $R=-0.222$ m. Ground plane and dipole feed in black, antennas in red. In the flexible phased array, $f=2.5$ GHz, antenna spacing is $0.6\lambda$, the antennas are quarter-wave dipole antennas.

A large number of radii of curvature may be iterated, where $R<0$ correspond to convex array orientation and $R>0$ to concave array orientation. In this example, $R \in \pm[0.025,1]$ m. At each iteration, a one-to-one mappings $$R \to |\vec{l}_{mn}| \text{ and } R \to \theta_{mn}$$

may be generated. To generate the bijection, K may be inverted:

$$\theta_{mn}(|\vec{l}_{mn}|) = \exists (\aleph^{-1}(|\vec{l}_{mn}|)) \quad (34)$$

Practically, this is implemented simply as a vector of $\theta_{mn}$ and a vector $|\vec{l}_{mn}|$, which are paired, and correspond to a vector of curvature radii.

The result may be a bijection between distance and angle which may be utilized to incorporating directivity in the model. To quantify directivity, there may be a number of options: analytical antenna model, simulated directivity pattern, direct measured results. Any of these options may yield a function $D(\theta)$, which completes the model for the transfer function, H.

Embodiments Including Iterative Spiral Match

Figure 10:
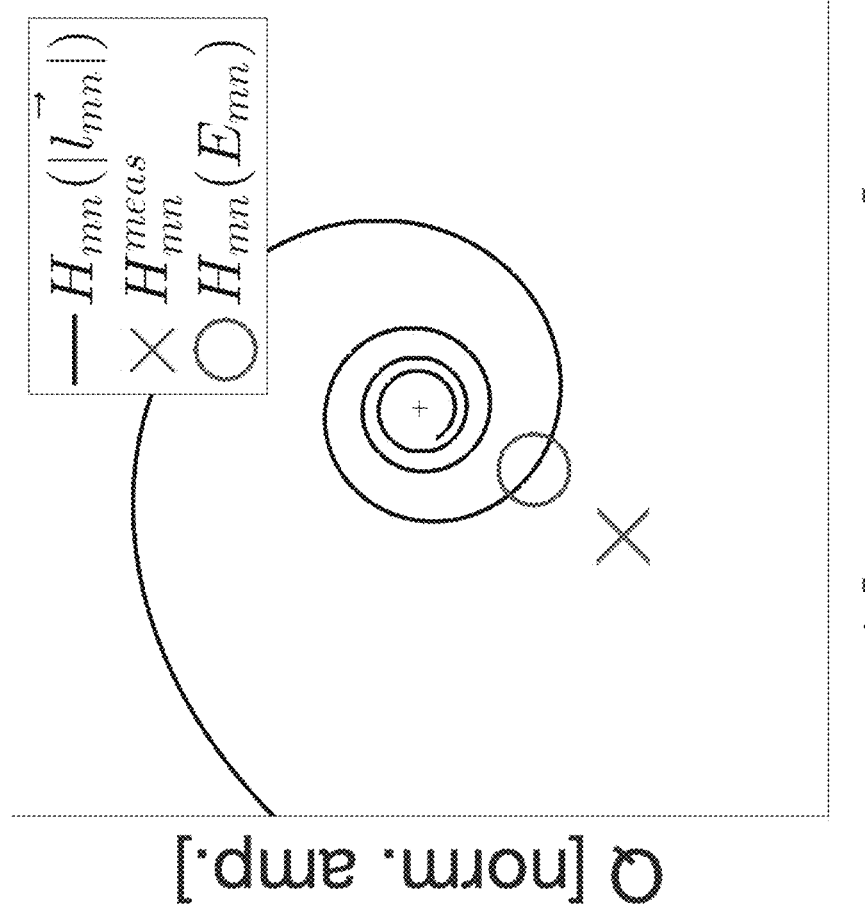
FIG. 10 is a visualization of the Spiral Match algorithm in accordance with an embodiment of the invention.

The model that draws a bijection between mutual coupling and distance may be utilized in a Spiral Match algorithm. The Euclidean distance between the elements m and n, as defined by (25), can be estimated by minimizing the magnitude of the difference between the measured transfer function, $H_{mn}^{meas} = S_{mn}^{meas, bent}/S_{mn}^{means, flat}$, and the estimate of (33):

$$E_{mn} = \left( \underset{|\vec{l}_{mn}| \in [d_{mn}^{min}, d_{mn}^{max}]}{\arg\min} H_{mn}^{meas} - H_{mn}(|\vec{l}_{mn}|) \right)^2 \quad (35)$$

where $d_{mn}^{min}$, $d_{mn}^{max}$ are the minimum and maximum physically possible distances for the antenna pair. This can be the projection of the measurement $H_{mn}^{meas}$ as onto the closest location on a spiral generated by $H_{mn}$, shown in FIG. 10, and may be the essence of Spiral Match algorithm. FIG. 10 is a visualization of the Spiral Match algorithm in accordance with an embodiment of the invention. In black, the coupling transfer function model, $H_{mn}(\vec{l}_{mn})$, for variable distance is given. The red "X" is the measured coupling, $H_{mn}^{meas}$. It is "projected" onto the model via the argmin function to provide the blue circle, which is the position on the model that corresponds to our predicted distance, $E_{mn}$. This location corresponds to the predicted distance, $|\vec{l}_{mn}|$. Unfortunately, because of measurement noise and imperfection, solving for the Euclidean distance in a single step may lead to errors, which can result in potentially non-physical solutions. The table below summarizes the steps of the iterative process:

| Iteration # | Constraint(s) | Action | Result | Calculation | Output |
|---|---|---|---|---|---|
| 1 | — | — | E1 | Calculate polarity | Polarity |
| 2 | Polarity | Add directivity if concave | E2 | Run RWC | Phase wrap matrix |
| 3 | Polarity, Phase wrap matrix | Restrict distance search space | E3 | — | — |

Single step Spiral Match projection may be prone to issues in the presence of non-line-of-sight (NLOS) element coupling for convex configuration, where NLOS and surface-mode coupling can dominate. In this case, power changes do not follow the simple directivity model. Additionally, amplitude ambiguity at a given phase for an imperfect measurement can lead to erroneous projection of the measurement onto an incorrect segment of the spiral (introducing distance error on the order of $\lambda$).

Small distance error may be acceptable and can potentially be fixed in the second step of the framework, SDR (semidefinite relation). Large distance error, however, often makes SDR unworkable and results in a completely erroneous shape prediction. Mitigating large distance error may be provided by the iteration process discussed below.

To mitigate these issues, the Spiral Match algorithm may be performed in a number of iterations, each time adding more constraints to the system to help ensure the accuracy of the predicted Euclidean distance. These iterations and the associated constraints are shown below. In the first iteration, it may be assumed no curvature polarity (concave/convex) to minimize constraints on the problem. Without a polarity, there may be no assumption of the geometry, and, thus, there may not include directivity in the model. For the first pass, there may be assumed $D(|\vec{l}_{mn}|)=1$, $\forall i$, $|\vec{l}_{mn}|$ and the optimization function in (35) may be used to compute the first prediction of the EDM, $E^1$. The result of this first iteration may be a very crude prediction of Euclidean distance that may be sufficiently accurate to determine the polarity of the shape. The polarity $p \in \{-1,+1\}$ (−1 being convex and +1 being concave) may be decided using a voting scheme:

$$p = \text{sign}(\Sigma_{i \neq j}(\text{sign}|\vec{l}_{mn}^{flat}| - E_{mn}^1)) \quad (36)$$

$N^2-N$ pairs is an even number and it's possible that $p=0$. If this happens, $|\vec{l}_{mn}^{flat}| - E_{mn}^1 \approx 0$ and a small degree of error in $E_{mn}^1$ may be pushing the difference above and below zero for different (i,j). In this case, the array may be in a flat or an approximately flat shape and the choice of polarity may be almost irrelevant. In the algorithm, p=0 cases may be overwritten to have p=+1 for these incredibly rare circumstances.

In the second iteration, p may be used to inform whether or not to include directivity in the coupling model. In the second prediction of the EDM, $E^2$ may be computed using the optimization function in (35). Having eliminated ambiguity about polarity and including the directivity for concave shapes, the next step may be to calculate phase wrapping-induced distance error. These errors are on the order of $\lambda$, which is often large enough to violate physical constraints, and so it becomes germane to develop such a solution that will intelligently identify violations. This may be referred to as "Recursive Wrap Correction" (RWC).

RWC, the details for which are provided below, is an algorithm that converts a matrix of integers, $R \in \mathbb{Z}^2$, representing the number of complete phase wraps associated with the distances in $E^2$, to a "corrected" phase wrap matrix, $R'$. It can also correct for outlier measurements not caused by phase-wrapping that may carry large distance error.

In the third iteration of the Spiral Match algorithm, the search space for distance is truncated to a single wavelength range as follows:

$$|\vec{l}_{mn}| \in [R'_{mn}\lambda, (R'_{mn}+1)\lambda) \quad (37)$$

to ensure that all predicted distances have the same number of wraps as RWC predicted. If R' is correct, this has the effect of ensuring there are no phase wrapping-induced distance errors, which improves Spiral Match's accuracy. Spiral Match culminates with a final minimization, using the reduced search space:

$$E^3_{mn} = \left( \arg\min_{|\vec{l}_{mn}| \in [R'_{mn}\lambda, (R'_{mn}+1)\lambda)} \left| H^{meas}_{mn} - H_{mn}(|\vec{l}_{mn}|) \right| \right)^2 \quad (38)$$

At this point, it's unlikely $E^3$ is perfectly symmetric. This is acceptable for the purposes of the next step—ASC—but it can be advantageous because two candidates for distance for each element pair may be used. In some embodiments, the two candidates may be compare and the better one may be chosen. An obvious candidate for this metric is the "projection error," $\Delta H$, defined as:

$$\Delta H_{mn} = \min_{|\vec{l}_{mn}| \in [R'_{mn}\lambda, (R'_{mn}+1))} \left| H^{meas}_{mn} - H_{mn}(|\vec{l}_{mn}|) \right| \quad (39)$$

which corresponds to the distance in the complex plane between the measurement and the model at the predicted point, $E_{mn}^3$. A large projection error is an indication that the model does not possess a complex value close to the measurement—implying large measurement error. However, this implication only holds some of the time. The correlation between prediction error and projection error occurs for the patch antennas discussed below, but not for the dipole antennas. Because this is another "switch," it may be turn flipped or not. To "flip it," the EDM may be forced to be symmetric using the projection error as the deciding metric:

$$E^{3'}_{mn} = \begin{cases} E^3_{mn} & \Delta H_{mn} \leq H_{nm} \\ E^3_{nm} & \Delta H_{mn} > \Delta H_{nm} \end{cases} \quad (40)$$

where $E^{3'}$ is the symmetrized version of $E^3$. $E^3$ (or $E^{3'}$) is the input to the second phase of the shape reconstruction framework algorithm, discussed below.

Embodiments Including Semi-Definite Relaxation

Using a prediction of the EDM corresponding to antenna phase centers on a flexible phased array, $E^3$, relative position, or shape may be reconstructed. Like many other high-dimensional problems, this can be solved with a single eigenvalue decomposition. Solving for the position with an EDM in this way is called "Classical Multi-Dimensional Scaling" (MDS), which involves few matrix operations. MDS, simple as it is, typically fails for imperfect EDMs. If, for example, $E_{mn}=|r_i-r_j|^2+\alpha_{mn}$, where $\alpha_{mn}$ is some noise-adding term, the eigenvalue decomposition may yield complex (e.g. non-physical) eigenvalues. Additionally, sparse or mislabeled EDMs cannot be used with MDS. A number of algorithms have been written and studied for different purposes and qualify as candidates for the second transformation, ASC.

In this system, sparse or mislabeled EDMs may not occur and choose to use semi-definite relaxation (SDR) as the candidate for ASC, for the following reasons:

1. SDR offers the option to use a mask matrix W to weight elements in the EDM individually. This allows control of how much each EDM entry "matters." Because local coupling measurements have higher quality than distant measurements, local measurements may be weighted more.
2. SDR searches a much smaller, convex vector space and, thus, guarantees a physical result while also decreasing runtime.
3. SDR showed the best performance along multiple metrics.

Some embodiments implement SDR written in MATLAB using "cvx," a framework for performing convex optimization in MATLAB.

The option to use a mask matrix W to window entries that have not been collected (e.g. in mic/speaker localization in a large theatre) is an option that allows this method to be utilized for large array systems, or ones where some elements have only either a receiver or a transmitter. In some embodiments, a completely dense EDM may be collected, and a mask matrix maybe used to weight entries based on SNR.

Recognizing that SNR $$(S_{mn}) \propto \frac{1}{|\vec{l}_{mn}|^2},$$

it is likely that EDM error, $\delta E$, defined as:

$$\delta E_{mn} = ||\vec{l}_{mn}| - E^3_{mn}| \quad (41)$$

follows the general trend:

$$\delta E_{mn} \propto |\vec{l}^{flat}_{mn}|^k \quad (42)$$

where k is some unknown exponent. This known relationship may be utilized by weighting higher quality EDM entries more than lower quality ones. The intuitive approach to implement this is to have entries in matrix W decrease as they move away from the diagonal.

The freedom to design W may be chosen, based on the system, to minimize shape reconstruction error. A number of structures for W may be explored, some of which are presented in Table I.

| Type | Equation | Variables |
|---|---|---|
| Uniform | $W_{mn} = 1$ | — |
| Binary | $W_{mn} = \begin{cases} 1 & |m-n| < a \\ 0 & |m-n| \geq a \end{cases}$ | a |
| Linear | $W_{mn} = a|m-n| + b$ | a, b |
| Quadratic | $W_{mn} = a|m-n|^2 + b|m-n| + c$ | a, b, c |
| Exponential | $W_{mn} = a^{-b|m-n|} + c$ | a, b, c |

In most of these structures, there is a design variable that can be turned to adjust for different systems and optimized to minimize shape reconstruction error. Superior performance may be produced with a mask matrix where entries are uniform for close pairs and exponential for far pairs.

Embodiments Including Passive Flexible Phased Arrays

In order to validate the proposed shape reconstruction method, several connectorized flexible phased arrays were built. While lacking the dynamic, multi-purpose capabilities of an integrated flexible phased array, connectorized arrays allow for quick measurements of mutual coupling (e.g., by a standard vector network analyzer). The connectorized array elements may be designed to have center frequencies close to 2.5 GHz with element pitch of 0.6λ. Results from eight-element, 1D arrays with folded dipole and patch antennas are presented below.

Figure 11:
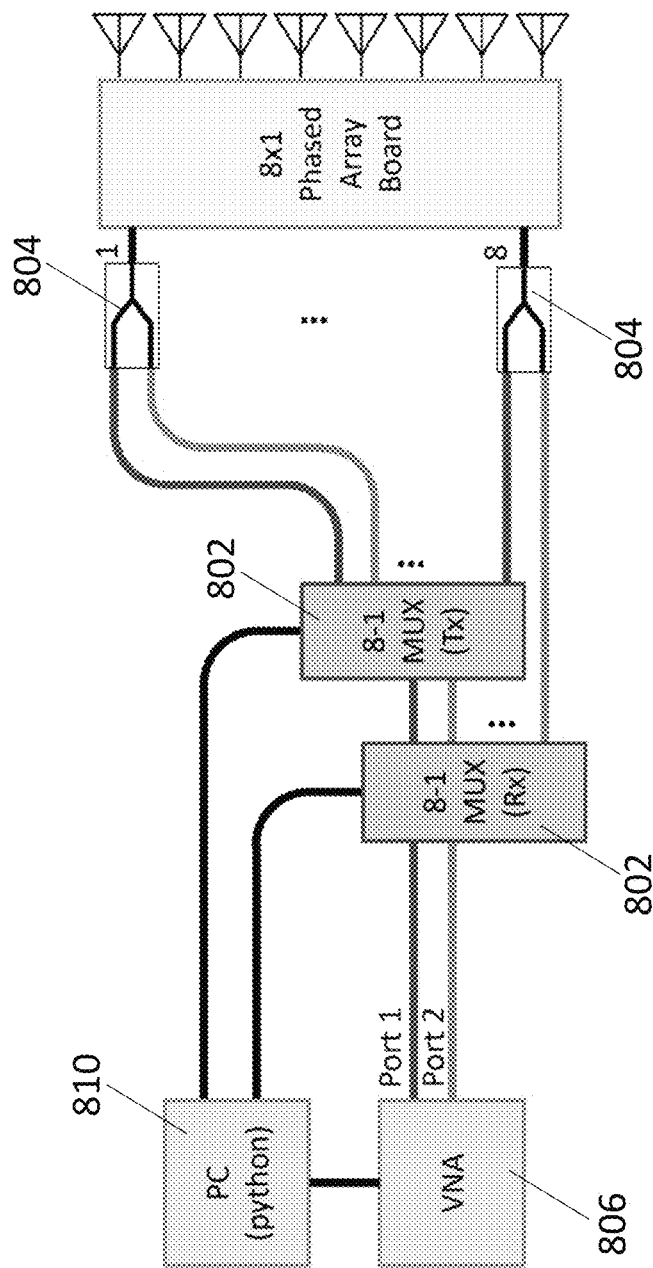
FIG. 11 is a measurement setup for coupling measurements of connectorized arrays in accordance with an embodiment of the invention.

A block diagram of the measurement setup of a connectorized array on the rigid frame is depicted in FIG. 11. FIG. 11 is a measurement setup for coupling measurements of connectorized arrays in accordance with an embodiment of the invention. In order to measure the full coupling matrix of the array without changing connectors, each element connects to an RF splitter 804 then two digitally controlled 8-to-1 RF multiplexers 802, which are then connected to the ports of a vector network analyzer 806. A computer 810 and script controls the multiplexers 802, triggers the VNA 802, and logs the coupling measurements. To flex the connectorized arrays into known shapes in a quick and repeatable fashion, rigid wooden frames of known convex and concave bend radii were designed and built. These frames are shown in FIG. 12A.

Figure 12A:
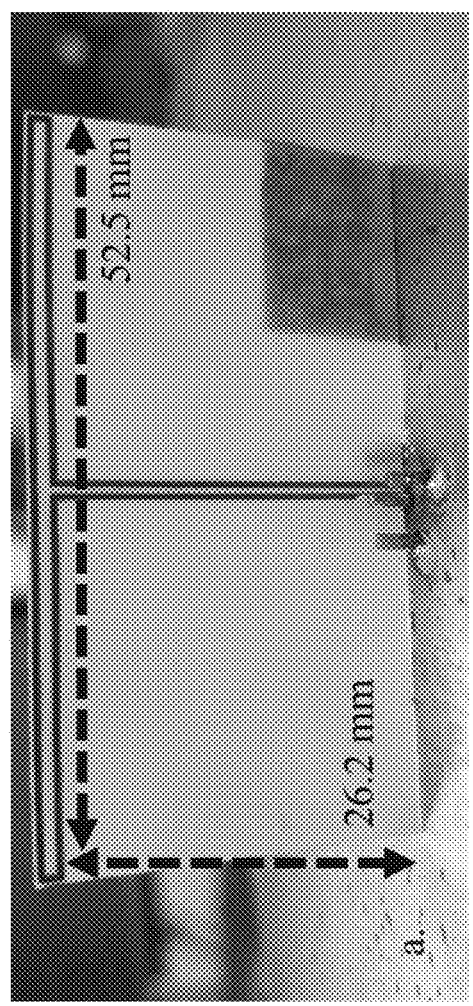
FIG. 12A illustrates an example folded dipole antenna with design dimensions.
Figure 12B:
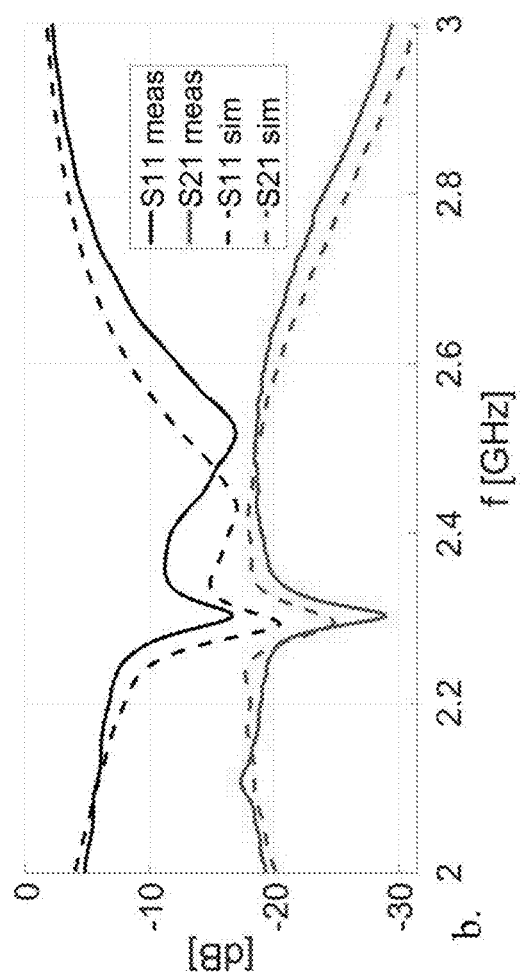
FIG. 12B is a plot of measured and simulated folded dipole input matching and adjacent element coupling.

The folded dipole used in the measurements is shown in FIGS. 12A and 12B. FIG. 12A illustrates an example folded dipole antenna with design dimensions. FIG. 12B is a plot of measured and simulated folded dipole input matching and adjacent element coupling. Ground plane backed dipoles (folded or unfolded) are well suited to mutual coupling shape reconstruction. Radiation from a dipole originates from the current distribution on the arms and is initially omni-directional (except for the direction along the arms themselves) prior to reflection off of the ground plane. Because this omni-directional radiation originates well above the ground-plane, the coupling may be less sensitive to occlusion and has propagation properties close to the ideal far field assumed by the simplified propagation model. The folded dipole presents an input impedance of 275 ohms at its arms. A high impedance edge-coupled quarter-wave transmission line extends to ground plane, transforming the antenna input impedance and connecting to a 50 ohm SMA connector.

Figure 13A:
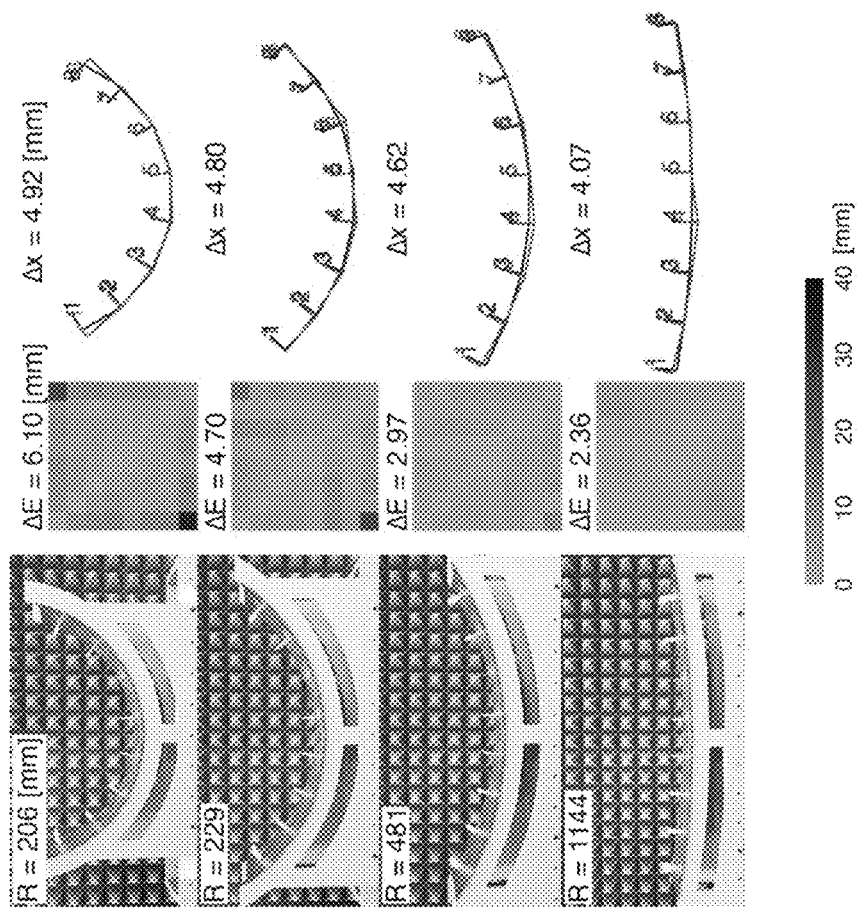
FIGS. 13A and 13B illustrate shape reconstruction results for passive 2.5 GHz folded dipole phased arrays.
Figure 13B:
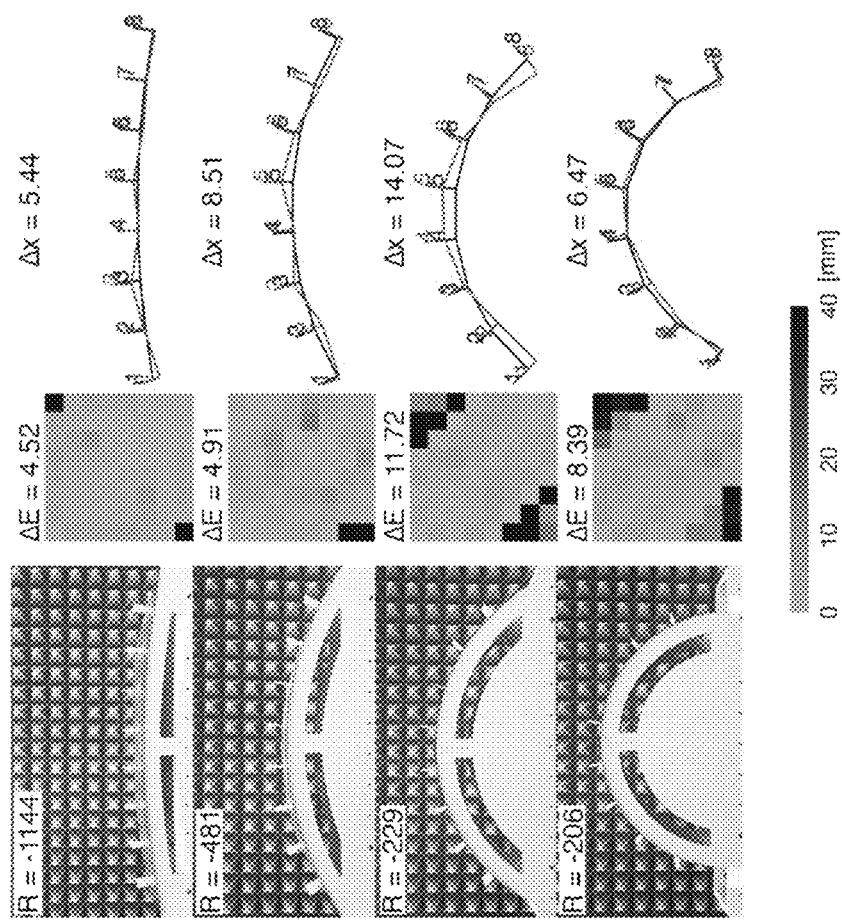

The folded dipole array shape reconstruction results are shown in FIGS. 13A and 13B. FIGS. 13A and 13B illustrate shape reconstruction results for passive 2.5 GHz folded dipole phased arrays. In FIG. 13A, the left images illustrate various concave wooden frames with dipole antennas and curvature radii. The middle images illustrate EDM error heatmaps and mean EDM error (ΔE) for concave shapes. The right images illustrate reconstructed antenna shapes (red), true antenna shapes (black), and mean shape error (Δx) for concave shapes.

In FIG. 13B, the left images illustrate convex wooden frames with dipole antennas and curvature radii. The middle images illustrate error heatmaps and mean EDM error (ΔE) for convex shapes. The right images illustrate reconstructed antenna shapes (red), true antenna shapes (black), and mean shape error (Δx) for convex shapes.

The far-field radiation pattern used in the algorithm was determined using a finite difference time domain (FDTD) simulator. The accuracy of the Spiral Match algorithm is measured by ΔE, the mean element pair distance error. ΔE is the mean difference between the predicted distances and the "truth" distance predicted by the known physical design dimensions of the frames. The accuracy of the shape reconstruction is measured by Δx, which is the mean difference between the reconstructed element position and the position of the elements according to the frame design dimensions. An exponential weighting matrix was used within the semi-definite relaxation algorithm.

The next array used for testing the shape reconstruction algorithm was an eight element linearly polarized patch antenna array. While the folded dipole antennas are near ideal candidates for shape reconstruction, patch antennas present a greater challenge. The challenges offered by patch antennas are a bellwether for if shape reconstruction could be a ubiquitous tool for a wide variety of flexible arrays or is limited to narrow subset of ideal systems. Typical patch antennas are low profile, highly resonant, and inherently directional with radiation emerging from fields located at both ends of the patch along its excitation axis (E-field line). In a flexible array, their low profile means they are more susceptible to occlusion and do not share the pseudo-omnidirectionality of the ground plane backed dipoles. The highly resonate nature (particularly when built on thin substrates) leads to low matching bandwidth. Low matching bandwidth can effect the quality of coupling measurements as a pair of patches could de-tune from each other as the array changes shape.

Figure 14A:
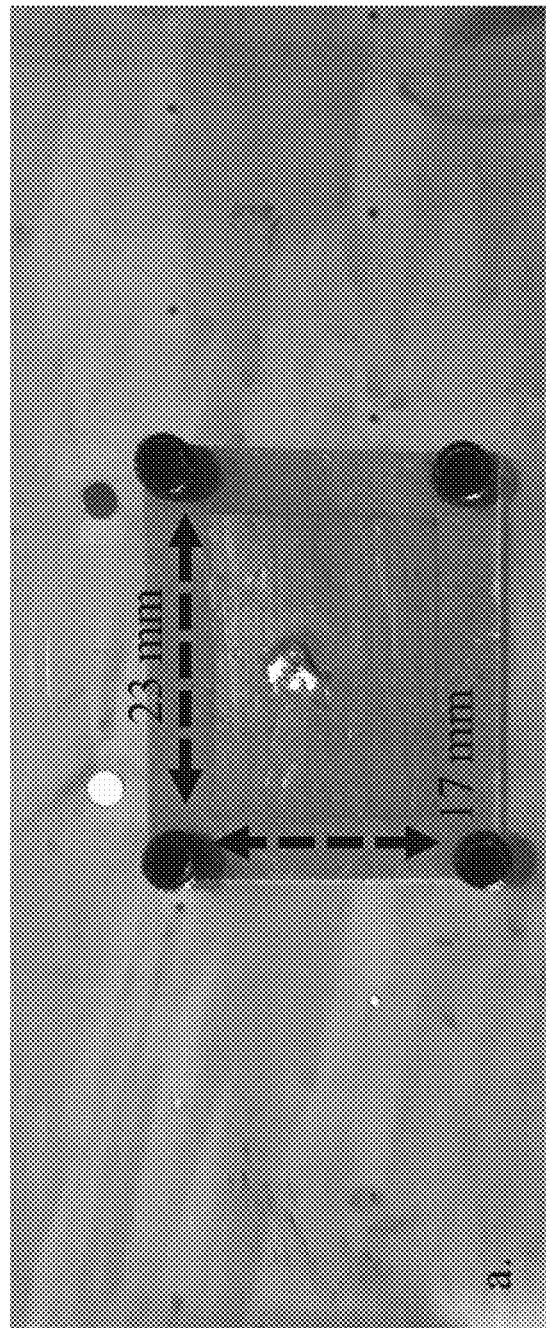
FIG. 14A is an image of a patch antenna with design dimensions.
Figure 14B:
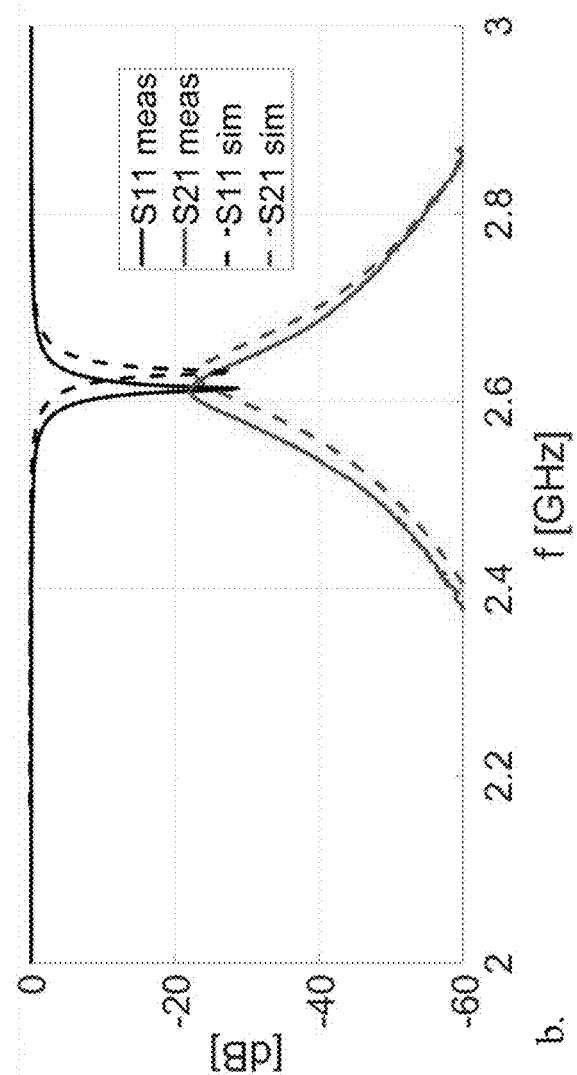
FIG. 14B is a plot of a measured and simulated patch antenna input matching and adjacent element coupling.
Figure 15A:
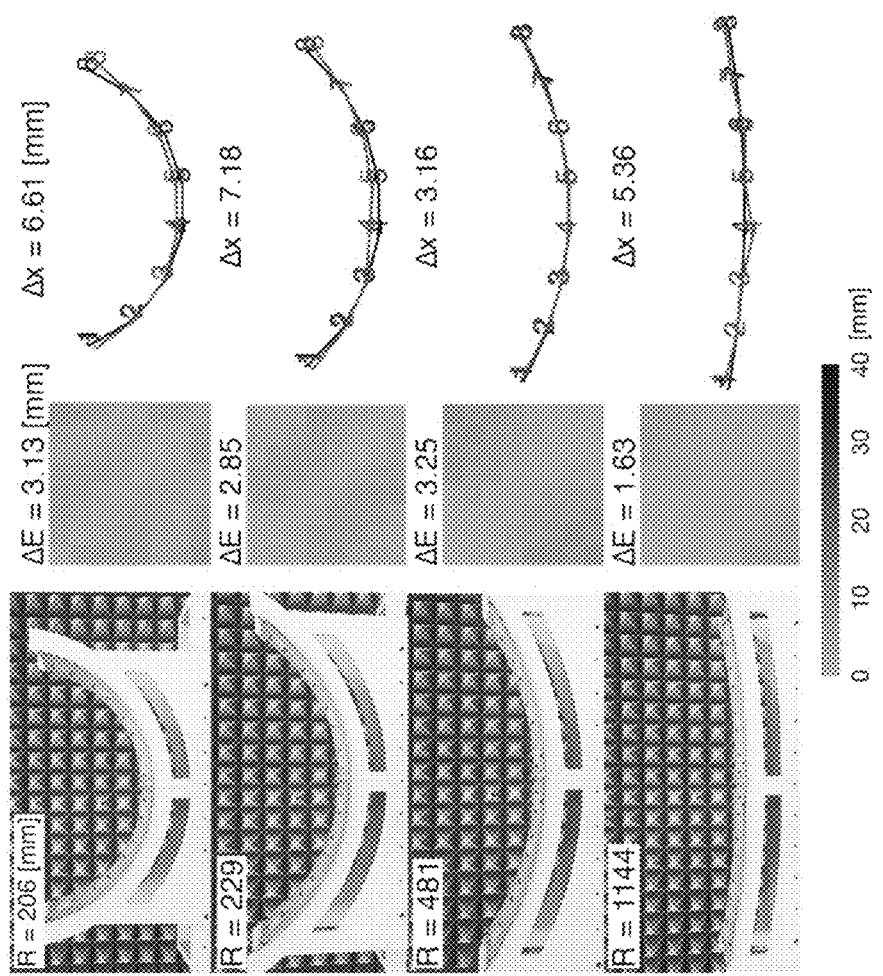
FIGS. 15A and 15B are shape reconstruction results for passive 2.5 GHz patch antenna phased arrays.
Figure 15B:
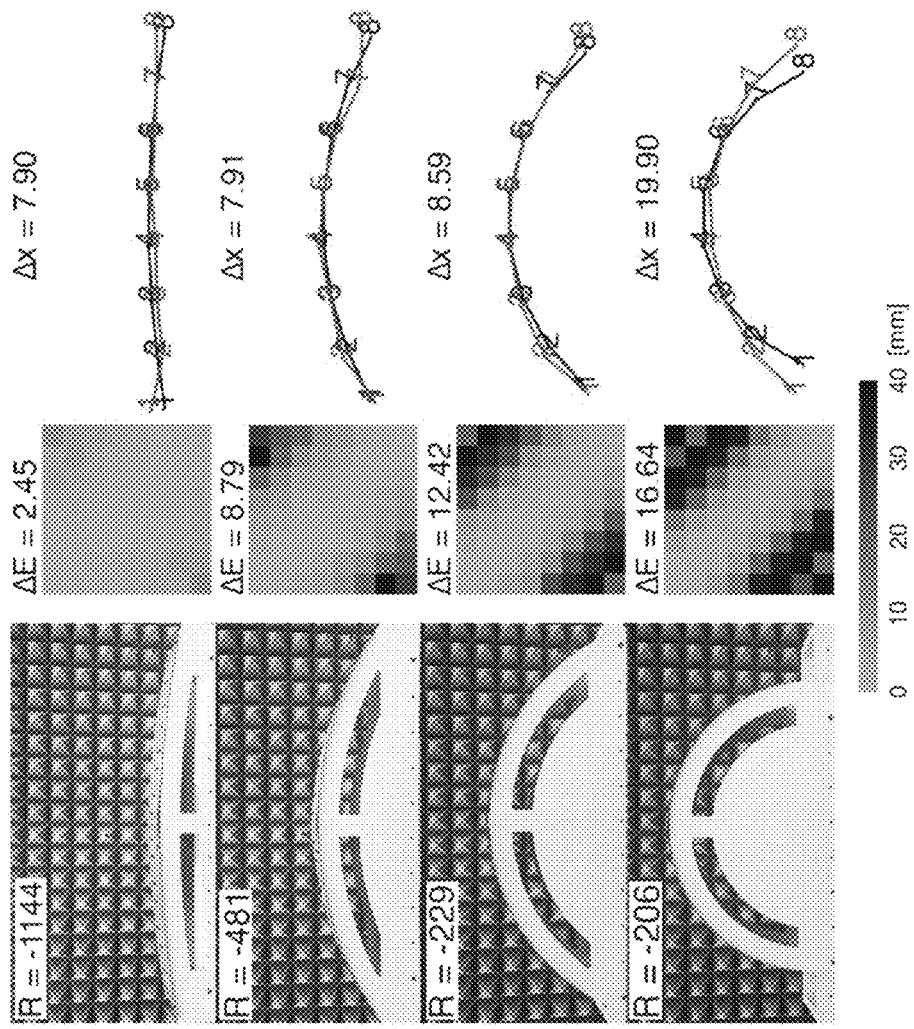

The presented patch antenna, depicted in FIGS. 14A and 14B, may be made with 1.27 mm thick high dielectric substrate ($\epsilon_r$ 11.2) in order to reduce their size and better facilitate bending. FIG. 14A is an image of a patch antenna with design dimensions. The substrate may extend 5 mm around the copper patch. FIG. 14B is a plot of a measured and simulated patch antenna input matching and adjacent element coupling. The feed is inset by 6.35 mm in order to match to 50 ohms. The far-field radiation pattern used in the algorithm was determined using an FDTD simulator. The results of the patch antenna shape reconstruction is shown in FIGS. 15A and 15B. The patch antennas shape reconstruction is as accurate as the dipole reconstruction with the exception of the most convex shape. The final matrix in FIGS. 15A and 15B shows higher error in the off diagonal element pair distances which would indicate that occlusion caused by the extreme bend is the culprit.

FIGS. 15A and 15B are shape reconstruction results for passive 2.5 GHz patch antenna phased arrays. In FIG. 15A, the left images are concave wooden frames with patch antennas and curvature radii. The middle images are EDM error heatmaps and mean EDM error (ΔE) for concave shapes. The right images are reconstructed antenna shapes (red), true antenna shapes (black), and mean shape error (Δx) for concave shapes.

In FIG. 15B, the left images are convex wooden frames with patch antennas and curvature radii. The middle images are EDM error heatmaps and mean EDM error (ΔE) for convex shapes. The right images are reconstructed antenna shapes (red), true antenna shapes (black), and mean shape error (Δx) for convex shapes. Despite this, the results show the viability of the shape reconstruction algorithm for radiator with tightly confined near-field profile.

Active Integrated Flexible Phased Array

Figure 16A:
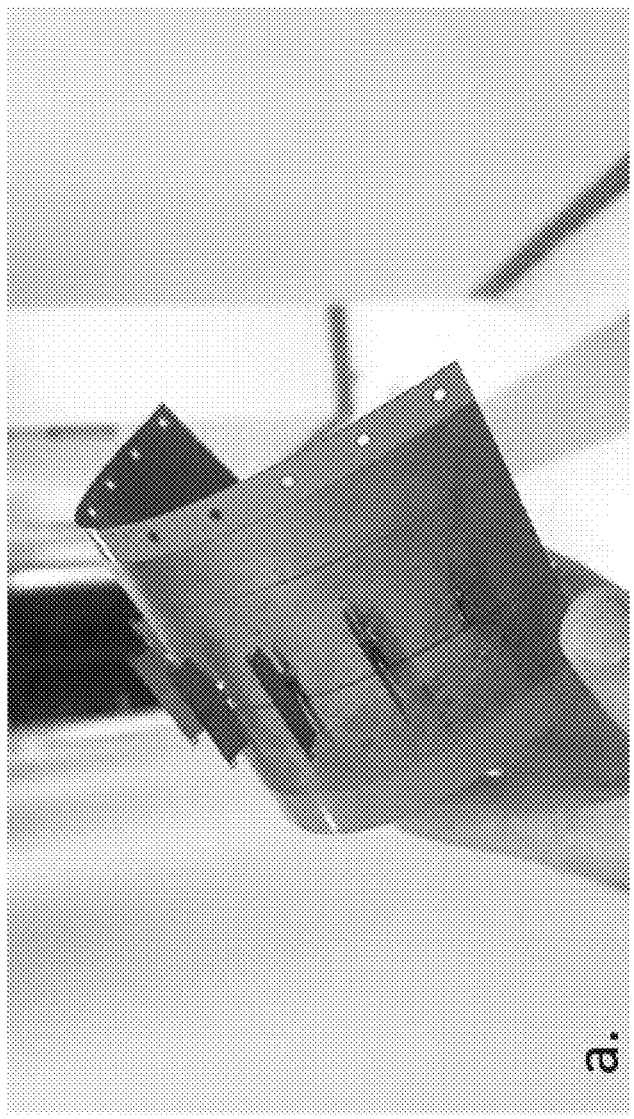
FIG. 16A is an integrated circuit-based flexible phased array with 8 elements bent with front shown.
Figure 16B:
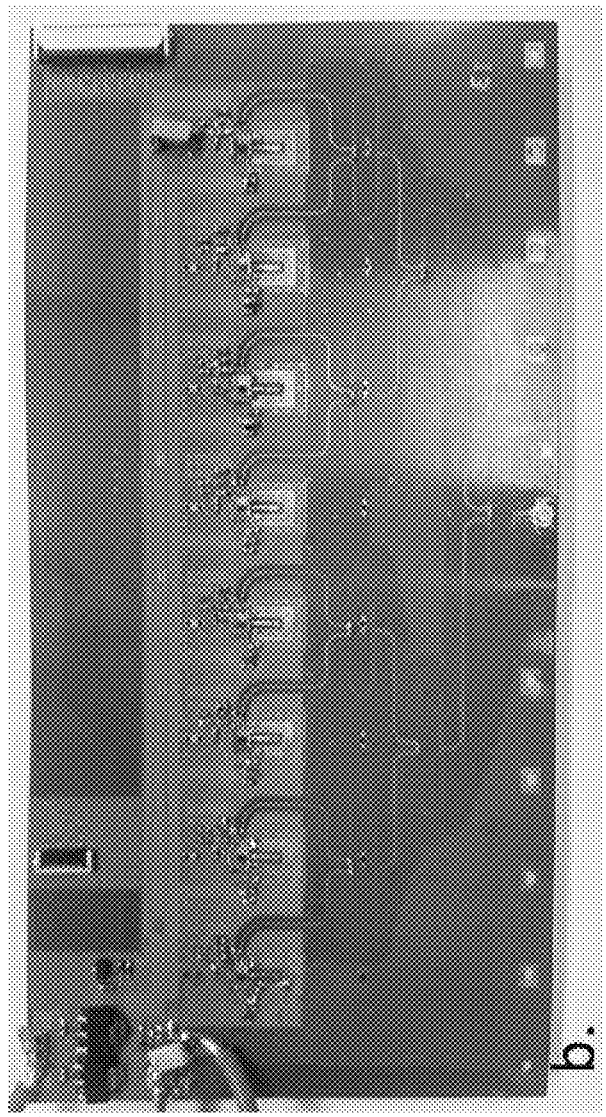
FIG. 16B is the back of the integrated circuit-based flexible phased array of FIG. 16A with feed network, chips, interposers, and circuitry shown.

While the passive, connectorized arrays discussed above are useful tools for understanding mutual coupling shape reconstruction, they may not provide the utility of a fully integrated flexible phased array. A truly self-contained flexible phased array may be enabled by RFICs, which combine array element functions (e.g. frequency synthesis, phase shifting, power amplification, etc.) in a compact and low-profile package. Conventional silicon ICs are rigid, but are sufficiently small as to not significantly change flexibility of a larger flexible phased array. An integrated circuit flexible phased array prototype was created to demonstrate mutual coupling shape calibration and reconstruction. The implemented array is a 1D, eight-element transmit and receive capable array operating at 10 GHz built on a 4-layer flexible printed circuit board (PCB) shown in FIGS. 16A and 16B. FIG. 16A is an integrated circuit-based flexible phased array with 8 elements bent with front shown. FIG. 16B is the back of the integrated circuit-based flexible phased array of FIG. 16A with feed network, chips, interposers, and circuitry shown.

Each element circuit may include a custom single channel transmitter/receiver integrated circuit which may be implemented in a standard 65 nm CMOS process. The RF path of the RFIC starts with a 2.5 GHz phase reference signal, which is shared by all elements in the array. The phase reference may be used by the phase-locked loop (PLL) to synthesize 10 GHz IQ signals. The PLL uses programmable divider current injection to provide 360°+ phase control to its output which is fed to both the transmit and receive paths. An SPI digital interface controls all programmable sub-circuits. In the transmit path, the signal passes through a programmable IQ summation phase shifter which provides another independent 360° phase control. The phase shifter may be controlled by a programmable SRAM, allowing for rapid phase-shifting for beam steering and/or data modulation. The phase shifter can be disabled and bypassed to reduce power consumption. With the PLL phase control and the IQ summer, the transmit and receive phase can be set arbitrarily and independently. The transmit path ends in a power amplifier (PA) and balun before the signal is sent off chip to the radiator.

The receive path begins at the same balun which the PA is driving. A receive-enable switch between one side of the balun and ground allows the receiver to measure the power amplifier output (switch closed) and allows the receiver to see higher impedance when the PA is not operating (switch open). A bypass-able amplifier ensures the receive channel has sufficient dynamic range to measure small signals as well as the large signals from self-loop or adjacent element measurements. This amplifier is followed by a direct down-conversion IQ mixer. The resulting baseband IQ signals are digitized and processed off-chip.

Figure 17:
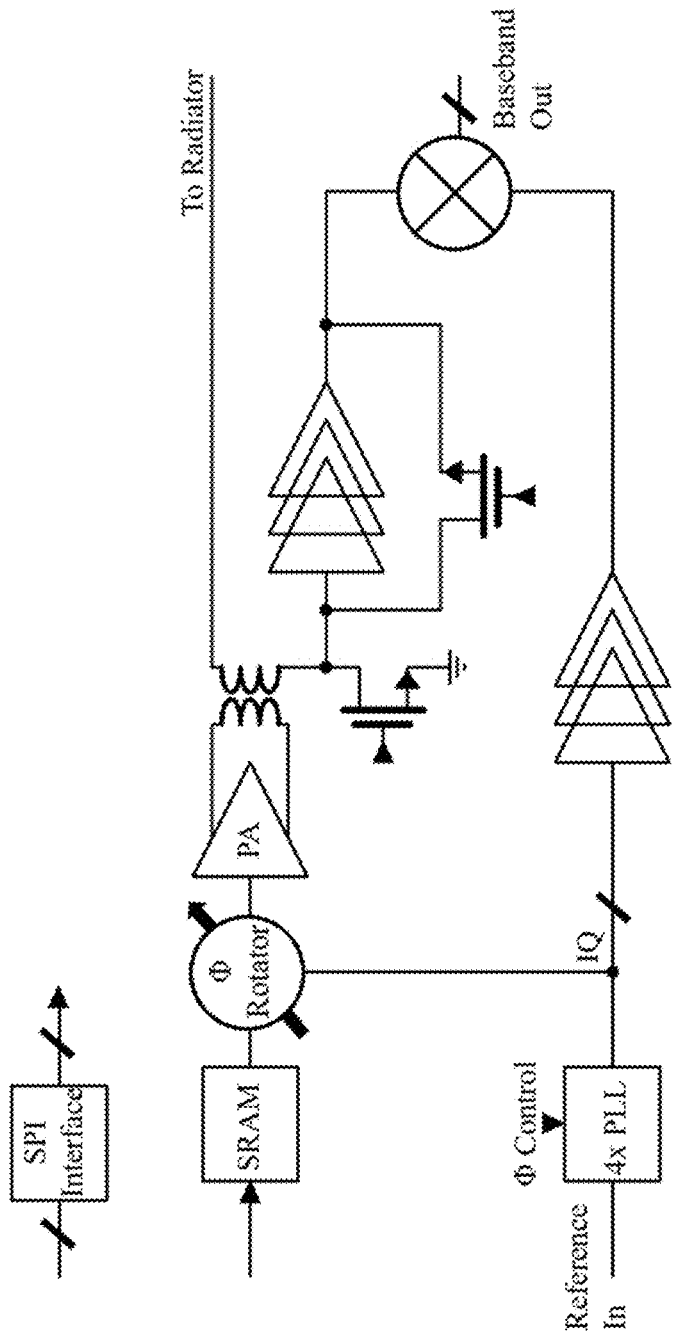
FIG. 17 is a schematic block diagram of a an RFIC element circuit.
Figure 18A:
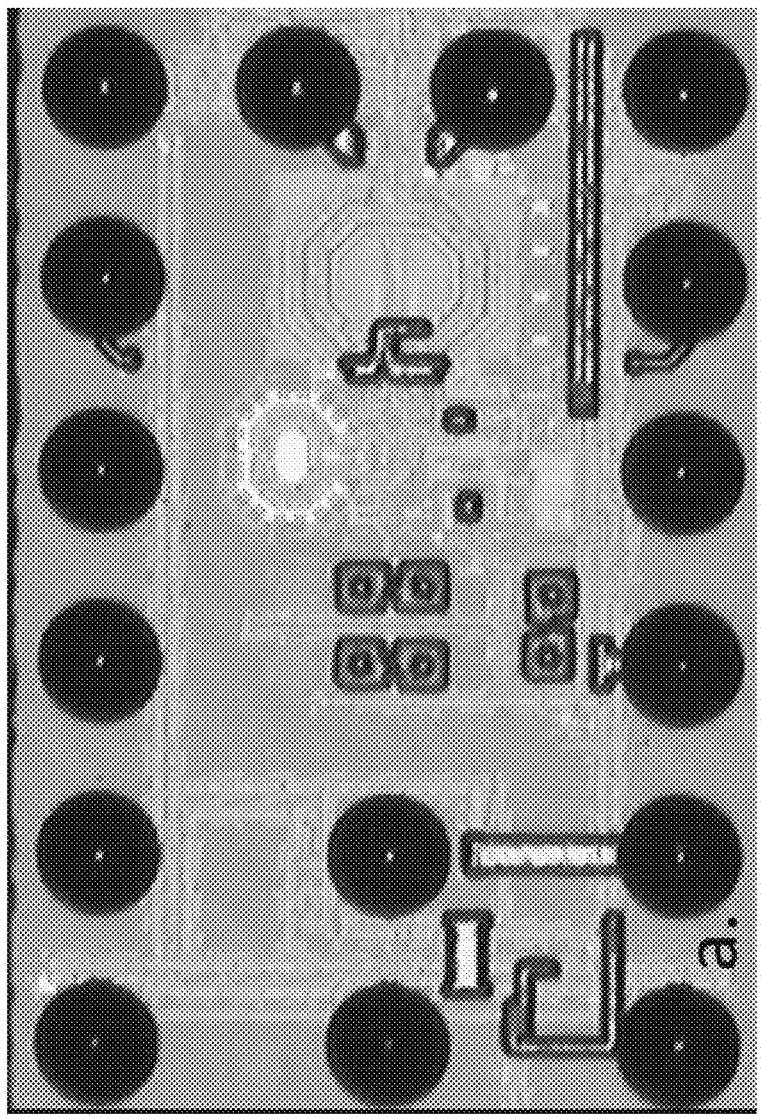
FIG. 18A is an image of an RFIC die.
Figure 18B:
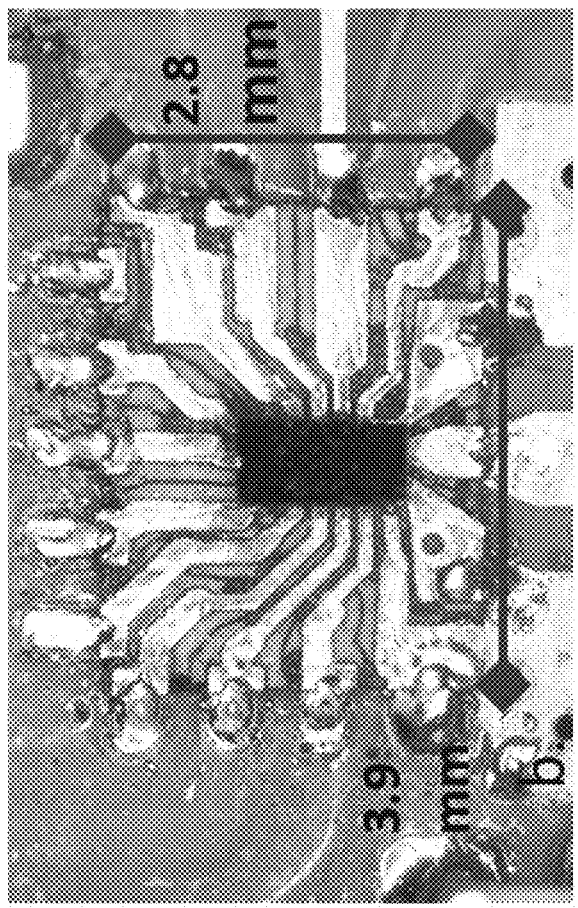
FIG. 18B is an image of an interposer with RFIC.
Figure 18C:
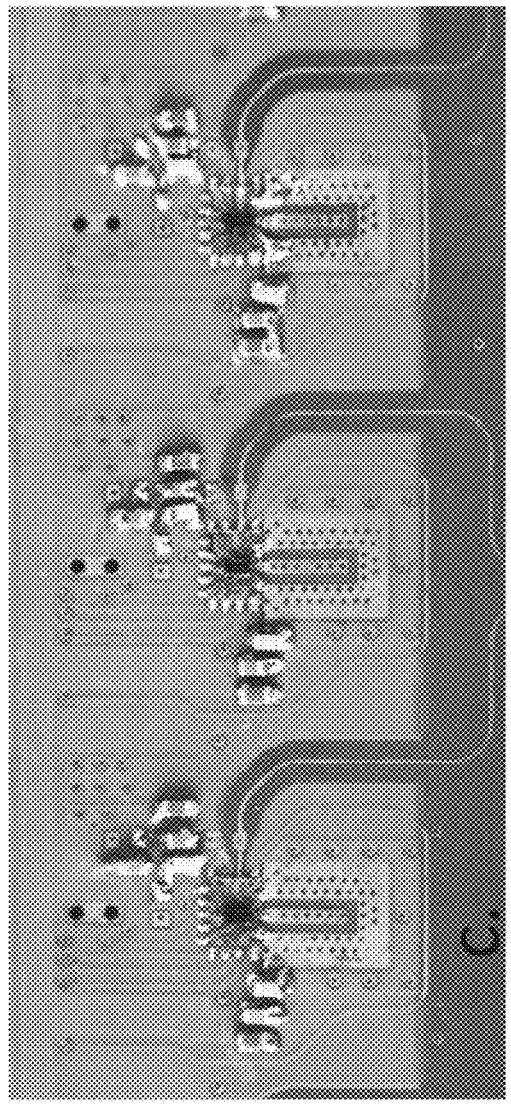
FIG. 18C is an image of 3 interposers mounted on flexible printed circuit board.

Each element RFIC may be mounted on a thin 2-layer interposer made from a traditional RF PCB substrate. While PCB substrates are rigid when thick, a small, thin interposer does not affect the flexibility of the larger board. The supply filtering capacitors may be aligned with the axis of bending to minimize their effect on overall stiffness, ensuring that bend radius is limited by plastic deformation of the flexible PCB. The block diagram is shown in FIG. 17 and RFIC die photo and interposer are shown in FIGS. 18A-18C. FIG. 17 is a schematic block diagram of a an RFIC element circuit. FIG. 18A is an image of an RFIC die. FIG. 18B is an image of an interposer with RFIC. FIG. 18C is an image of 3 interposers mounted on flexible printed circuit board.

Figure 19A:
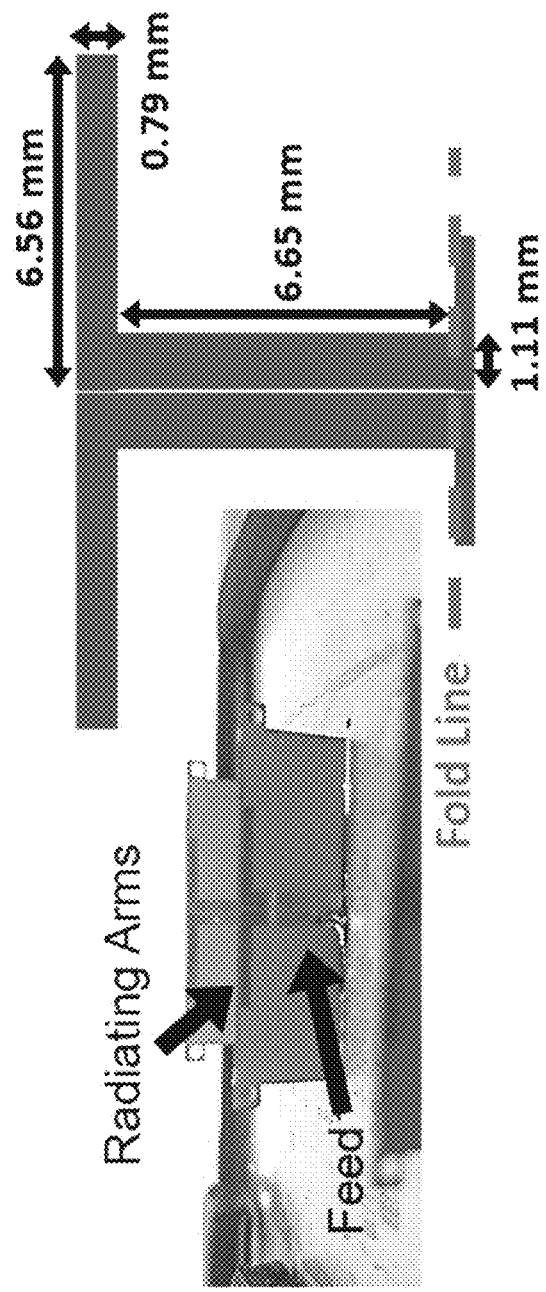
FIG. 19A illustrates a radiator mounted perpendicular to the surface of the ground plane which avoids the need for a thick, likely rigid, layer of substrate.
Figure 19B:
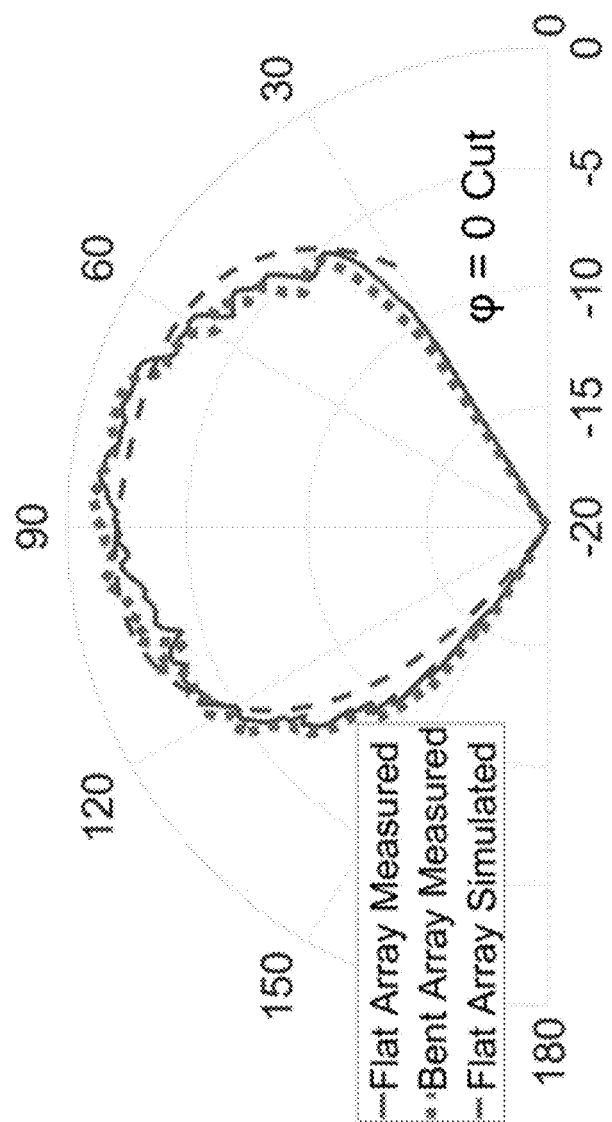
FIG. 19B is the measured and simulated far-field patterns with bending.
Figure 19C:
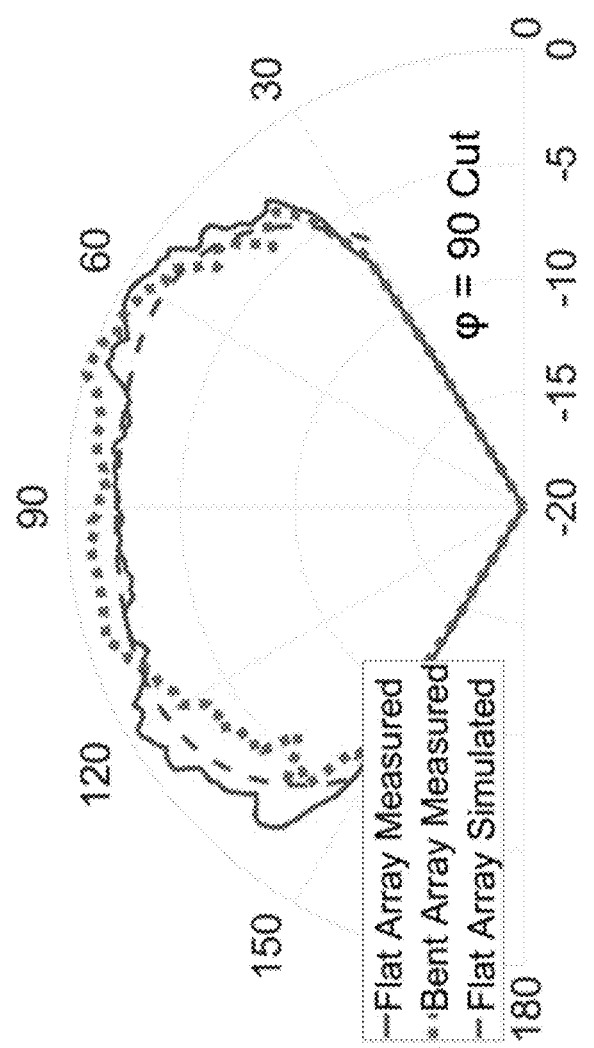
FIG. 19C is the measured and simulated far-field patterns without bending.

The radiator, built from a single sheet of copper on polyimide, is a ground plane backed dipole. By aligning the dipole arms with the axis of bending, the array can be flexed significantly without strongly affecting radiator performance. In addition to having favorable properties for shape reconstruction, ground plane backed dipoles provide the wide, single lobe pattern that is desirable for beam-steering applications. FIG. 19A illustrates a radiator mounted perpendicular to the surface of the ground plane which avoids the need for a thick, likely rigid, layer of substrate. The radiator may be mounted on a flexible printed circuit board. The feet beneath the fold line are soldered to the circuit board. Element pitch may be 0.6λ. FIG. 19B is the measured and simulated far-field patterns with bending. The measured and simulated in-array element pattern may be for φ=0° cut. Pattern may be measured flat and when array is conformed to a 120 mm convex bend radius. FIG. 19C is the measured and simulated far-field patterns without bending. One leg of the radiator connects to a single-ended transmission line while the other is grounded. The vertical feed acts as a balun to convert the input to a differential drive for the radiating arms. The in-array element pattern may be for φ=90° cut. All measurements are normalized to their global maximum. Overall, the simulated, flat, and bent results match closely.

Residual asymmetry may be observed in FIG. 19B as the pattern tilts slightly towards the grounded leg. Deviation between bent and flat performance is present in the φ=90° cut where the bent result experiences slightly less lobe splitting than the flat simulated and measured results. This is consistent with the expectation that a convex bend increases element spacing, decreasing the inter-element coupling which contributes to lobe splitting. This pattern change with array shape is small and does not meaningfully affect the quality of the shape reconstruction results.

Figure 20:
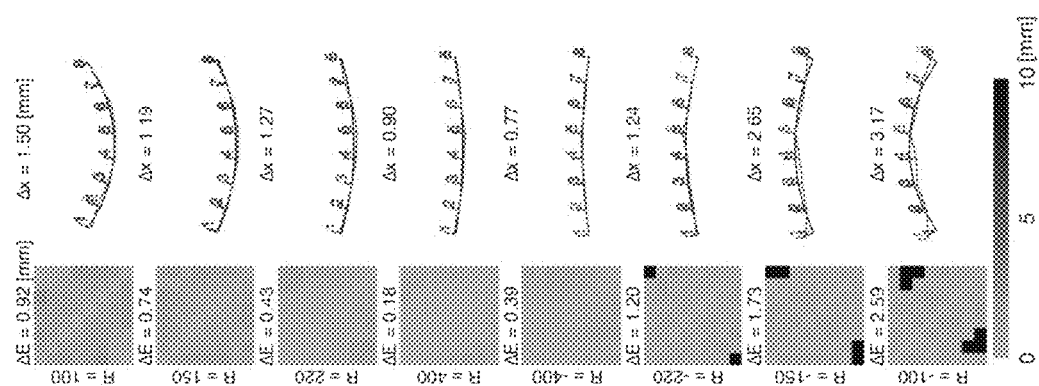
FIG. 20 is shape reconstruction results for integrated 10 GHz phased arrays with dipole antennas for various radii of curvature.

Shape reconstruction using the flexible integrated circuit based phased array is demonstrated in FIG. 20. FIG. 20 is shape reconstruction results for integrated 10 GHz phased arrays with dipole antennas for various radii of curvature. The left images are EDM error heatmaps and error mean (ΔE). The right images are reconstructed antenna shapes (red), true antenna shapes (black), and shape error mean (Δx). Eight rigid frames (R=±100, 150, 220, 400 mm) were used to provide repeatable reference dimensions. The on-chip power amplifiers and receivers were used to collect the coupling measurements. When adjusted by a factor of four to account for wavelength difference between 2.5 GHz and 10 GHz, the final shape error, Δx, outperforms the connectorized 2.5 GHz dipole array. The minimum, maximum, and average Δx is lower. While some of this performance increase can be contributed to a smaller ratio of bend radii to array length, it shows the viability of shape reconstruction in integrated circuit arrays. The shape reconstruction framework is shown to be frequency agnostic by these results. While the framework itself is agnostic, there are practical concerns for which frequency is involved. The 10 GHz array is smaller, as such nearby objects and reflectors relatively farther away and less likely to effect local coupling measurements through reflections. As such the higher frequency may be responsible for the more accurate results. Improved quality of coupling measurements does come with a mechanical trade-off. As the operation frequency of the array rises, its flexibility could decrease as the density of rigid or semi-rigid components and the complexity and thickness of signal routing increases with finer antenna pitch.

The described framework is multi-staged and multi-faceted, offering many opportunities for modification and expansion. This framework can easily be implemented when other antennas, sizes, or array constraints are in use.

A system that has other sensors or capabilities can easily accommodate an algorithm relying on angle or curvature as the constraint. Choosing another physical constraint may include modifications to or alternatives for PCM and ASC as well.

The PCM algorithm (e.g. Spiral Match algorithm) is rooted in a model for the coupling. This model can easily be changed to include other constraints or known EM phenomenon to improve its versatility and our accuracy. The simplified model may be used to predict the Euclidean distance in three iterations but, again, these iterations and the constraints they leveraged may be system-dependent. Additional iterations can be added if a system is more or less constrained. Moreover, the parameters of the iterations can be easily changed for new systems. For example, the constraints used in the Recursive Wrap Correction algorithm can be easily changed.

New candidates for PCM could leverage frequency diversity if the system included broadband antennas. While broadband systems could use the single frequency approach disclosed herein, frequency diversity may alleviate phase wrapping ambiguity when determining distance. Mutual coupling may be measured at multiple frequencies or using a chirp similar to frequency modulated continuous wave (FMCW) radar from which a distance matrix would then be constructed.

EDM (e.g. the ASC algorithm) algorithms may each solve a different type of problem. In a massive 2D array (e.g. 100×100), coupling may only be investigated locally, leaving a sparse EDM. This system might include a different method to deal with highly sparse EDMs. The freedom to choose the ASC algorithm makes the framework highly modular to any number of non-idealities in the EDM. Many EDM applications include a mask matrix as a design parameter. Some embodiments may include banded mask matrices that decay exponentially.

Embodiments Including Recursive Wrap Correction

As discussed above, the iterative Spiral Match algorithm may include RWC. The input to RWC, R, may be defined as:

$$R_{mn} = \text{floor}\left(\frac{E_{mn}^2}{\lambda}\right) \quad (43)$$

The problem of phase wrapping implies that $R_{mn}$ is occasionally 1 or 2 phase wraps greater or less than the true number.

RWC takes place in two steps: recursive error correction and matrix selection.

1) Recursive Error Correction: The root method of this step, $\Theta(R)$, is a recursive algorithm which inputs an (potentially) erroneous phase wrap matrix, R, and outputs either:

Itself, if R is free of errors. This is the canonical "base case."

$[\Theta(R^1), \Theta(R^2)]$, where $R^1$ and $R^2$ are two options for matrices that correct a single rule violation in R.

A matrix, R, has potentially many rule violations; each violation is associated with two potential corrections. Thus, recursive error correction involves generating and traversing a binary tree of matrices, where R is the highest parent node and the terminal nodes form a set, $\{R^0\}$, of error-free alternatives to R.

$\Theta(R)$ begins by searching R, starting on the two inner diagonals to the right and left of the main diagonal ($\{R_{mn}, \forall |m-n|=1\}$) and ending at the two corner elements ($\{R_{mn}, \forall |m-n|=N-1\}$). Each element is checked for the following two possible rule violations: 1) Discontinuity (ie. $|R_{m,n} - R_{m,n+1}| > a$); 2) Wrong direction (ie. $R_{m,n} > R_{m,n+1}$) The exact conditions of these violations (how discontinuity is defined, in what circumstances the direction is "wrong", etc.) may depend on the system this algorithm is being implemented in. The system includes antennas separated by $0.6\lambda$, thus defining "discontinuity" as a difference in wrap count between mutual matrix elements greater than 1 (a=1). The wrap counts may strictly increase for increases in $|m-n|$ ("Wrong direction").

When an error is discovered, the algorithm breaks out of the search and begins a new iteration of $\Theta(R)$ with two alternatives as inputs. These two alternatives are new matrices, $R^1$ and $R^2$ each with a single element changed that simultaneously corrects the rule violation and does not introduce a new violation.

Recursion continues until all alternatives are error free or a stop condition is reached. The rule violations and corrections are defined in a way that the stop condition is rarely reached. The result of this process is a set, $\{R'\}$, of correct phase wrap matrices that are alternatives to the original input, R. After, the next phase maybe matrix selection, to pick the final phase wrap matrix, R'.

2) Matrix Selection: The first phase of matrix selection is to cut matrices that violate any of the following "global" criteria (ordered from most important to least):

1) Duplication (ie. $R'_k = R'_l$, $k \neq l$);
2) Absolute distance limits; and
3) Symmentry (ie. $R'_k \neq R'_k{}^T$).

Cuttings take place in these three stages. If any stage results in the cutting of all but one option, that option becomes $R^0$. If any stage results in the cutting of all options, the cuts do not take place and the algorithm moves to the next stage.

If after these 3 rounds of cuts there are still multiple options voting takes place based on a set metric. Examples of metrics include:

Curvature Discontinuity: favor matrices that reflect constant curvature conditions.

Symmetry: favor the "most symmetric" matrix. This obviously only applies if the third round of cuts does not take place.

Change: favor the matrix that is closest to the original.

If the system possesses constraints that can be leveraged, a metric can be designed to pick the phase wrap map that most aligns with that constraint. In this case, symmetry may be utilized if the last cut does not take place and curvature discontinuity otherwise.

The conditions for arriving to this point may be rare. In the vast majority of cases, the original input, R, is free of rule violations and, thus, is also the output R'—these metrics and conditions having absolutely no impact on the outcome. RWC may be seldom used because a dataset large enough to accurately test for the best metric may be rare. On the other hand, in the case where an erroneous phase wrap matrix is produced by the second iteration of Spiral Match, RWC may provide a realistic alternative that can correct for phase wrapping errors.

The above discussed processes can be generalized for higher dimensional arrays or constellations of elements where there are known constraints (such as element pitch) between clusters. In the case of a 2D distributed array, there may be more constraints than degrees of freedom and the process may be overconstrained. This may rule out the possibility of using a simple geometric approach in an error-prone system. In some embodiments, the system may be formulated performed in the 1D case, and use an error minimization to optimization for the shape.

Some systems may be so highly constrained that it may not be desirable to use all the information: A large number of degrees of freedom implies a computationally expensive optimization that may have a higher potential to fall into local minima and fail; decreasing the number of degrees of freedom may help make the system less overconstrained. If the field of constraints are culled intelligently, the above formulation may be used to stitch clusters in 2D while mitigating concerns about falling into local minima or expanding the runtime and power consumption of the stitching algorithm.

The above discussed algorithm constitutes a simple geometric method to "stitch" clusters of elements which are locally, but not globally, shape reconstructed. This method is flexible, allowing for the integration of physical constraints unique to different systems to minimize error propagation. This may have great advantages for a number of applications. For example, the systems may be utilized in wireless power transfer (WPT) and/or communications, where phased arrays have seen most of their utility and where phase setting for beamforming is critical. Here are some contexts in which this method can be used toward these ends: deployable WPT arrays for space; deployable communications platforms for space; WPT arrays integrated into fabrics; communication arrays integrated into fabrics; deployable WPT and/or communication arrays for boats/cars/planes/large vehicles; and/or conformal arrays for planes/boats/vehicles. Different applications are associated with different system time constants—a reflection of how long the system has before the shape changes. This time will set an upper limit on how long the system may operate, placing demands on the runtime and hardware. The system may be implemented in large-scale wireless power transfer arrays integrated into normal objects (window shapes, drapes, bed sheets, etc.) in a residential or commercial environment.

As opposed to using shape reconstruction as a means to beamform, the shape can be the end itself. This method can make use of electromagnetic resonators for the purpose of shape reconstruction—as a shape sensor—in the following contexts: biosensors to detect body configuration/conformation; for athletes; for people/animals with injuries—as a therapeutic tool; for VR applications, in gaming, in simulations, or in VR entertainment; sensing the configuration of cars on the road; detecting the configuration of drones/planes/satellites in a constellation; sensing topology of nodes on a local wireless network; sensing topology of nodes on a large wireless network; prediction of channel state information for efficient wireless networks; and/or use as an electromagnetic tool (e.g. with conformal arrays, to detect conformation shape after installation, to detect antenna's directivity pattern, to compute phase offset at the end-point of propagation). The biosensing applications would require the array to be biocompatible (e.g. safe, flexible) with changes to the electromagnetic coupling model to account for mode transmission across the body. The car configuration and topology sensing would require the coordination of independent nodes, or communication with some centralized node. In some embodiments, the shape reconstruction systems may include large-scale shape sensors for humans, animals, or other objects for athletics, gaming, VR, physical therapy; large-scale communications platforms that are flexible, collapsible, or otherwise reconfigurable; and/or large-scale, flexible power transfer systems in for space solar power applications.

Very large array systems, may exceed the dimensions that can be serviced by singular clock lines or single RFICs, can benefit greatly from the disclosed system and methods, which may enable large-scale shape reconstruction on distributed platforms. Bridging the gap to the next generation of large-scale and distributed systems may include high-power, high accuracy array systems that demand accurate and reliable distributed shape reconstruction methods.

Though the embodiments disclosed above include reconstruct shape without any "additional" hardware, other sensors can help add information to improve performance or offer new possibilities. For example, the system may include use of parasitic Tx/Rx radiators in addition to those on the array. Also, the system may include environmental sensors (e.g. temperature, strain, light sensors) to detect changes to array. The environmental sensors may be utilized to estimate changes to devices/transmission line that can be de-embedded.

Example Operating Procedure

Figure 21:
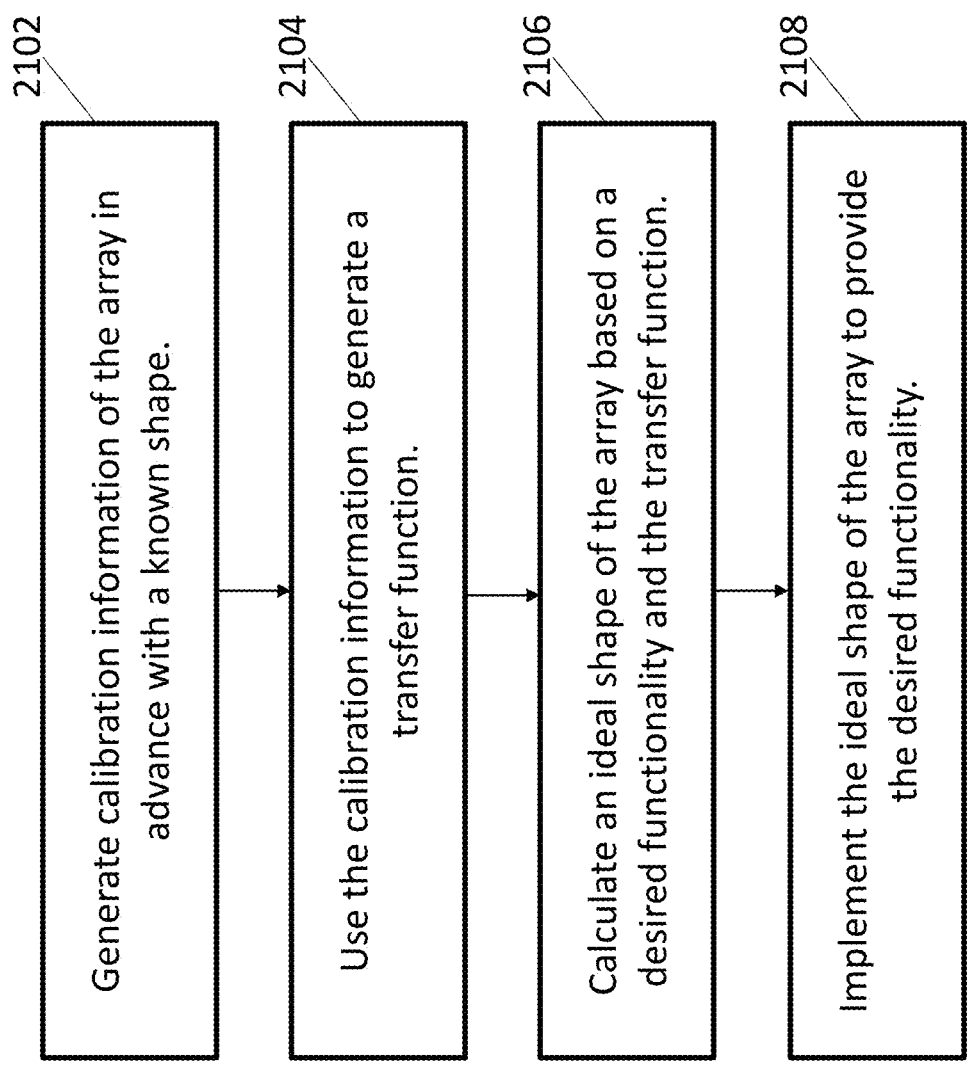
FIG. 21 illustrates an example operating procedure for performing the calibration of the shape of the antenna array.

As discussed above, various embodiments of the invention involve recalibrating the shape of an antenna array based on a desired functionality. FIG. 21 illustrates an example operating procedure for performing the calibration of the shape of the antenna array. The procedure includes generating (2102) calibration information of the array in advance with a known shape. In some embodiments, the known shape may be a flat configuration of the antenna array. This calibration produces phase offsets inherent to the array. The procedure further includes using (2104) the calibration information to generate a transfer function, $H_{meas}$. The procedure to generate this calibration information is previously discussed in detail. The procedure further includes calculating (2106) an ideal shape of the array based on a desired functionality and the transfer function, $H_{meas}$. The shape of the array may produce different functionality for the array which may be dictated by the transfer function. The procedure further includes implementing (2108) the ideal shape of the array to provide the desired functionality.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents. Littrow angle, mechanical baffle and beam dump can be placed to eliminate the spectral overlap.

What is claimed is:

1. A reconfigurable phased array comprising:
   a constellation of antennas configured to receive a received radiation and transmit a transmitted radiation, wherein each of the antennas senses incidental power from the transmitted radiation from the other antennas of the constellation of antennas; and
   a computer system configured to:
      measure the incidental power sensed by the each of the antennas;
      perform a physical constraint mapping of the constellation of antennas; and
      perform an array shape construction to determine a current position of each of the antennas based on the physical constraint mapping and the incidental power sensed by each of the antennas.

2. The reconfigurable phased array of claim 1, wherein the computer system is further configured to utilize the determined current position to determine antenna excitation configurations of the antennas.

3. The reconfigurable phased array of claim 1, wherein the constellation of antennas is positioned on a flexible substrate.

4. The reconfigurable phased array of claim 3, wherein the flexible substrate is bendable to reposition the constellation of antennas into an ideal position of each of the antennas.

5. The reconfigurable phased array of claim 4, wherein the computer system is further configured to control the position of the constellation of antennas into the ideal position of all the antennas.

6. The reconfigurable phased array of claim 1, wherein the constellation of antennas is positioned on a stretchable substrate or a foldable substrate.

7. The reconfigurable phased array of claim 1, wherein the physical constraint mapping utilizes a possible mutual angle, antenna distance, and/or local curvature of the constellation of antennas.

8. The reconfigurable phased array of claim 1, wherein the physical constraint mapping comprises modeling the incidental power sensed by the each of the antennas into a raw mutual coupling matrix $S \in \mathbb{C}^{N \times N}$, wherein $\mathbb{C}$ is the space of all complex numbers and N is the number of antennas in the array.

9. The reconfigurable phased array of claim 8, wherein the raw mutual coupling matrix is defined by:

$$S_{mn} = \frac{a_m D_m(\theta_{mn}) a_j D_n(\theta_{nm})}{|\vec{l}_{mn}|} e^{-j(\phi_m + \phi_n + k|\vec{l}_{mn}|)}; \text{ and}$$

$$\theta_{mn} = \cos^{-1}\left(\frac{\vec{r}_m \cdot \vec{l}_{mn}}{|\vec{l}_{mn}|}\right),$$

wherein $a_m$ is a total fixed amplitude offset in antenna m, $D_m(\theta)$ is a directivity of antenna m for an angle $\theta$ relative to broadside, $\vec{l}_{mn}$ is a vector pointing from a phase center of antenna i to the phase center of antenna n, $\phi_m$ is a total fixed phase offset in antenna m, and $\vec{r}_m$ is a unit vector normal to a surface of the constellation, that describes an orientation of antenna m.

10. The reconfigurable phased array of claim 9, wherein the physical constraint mapping further comprises performing simulation and analysis to calibrate the constellation of antennas.

11. The reconfigurable phased array of claim 9, wherein the physical constraint mapping further comprises performing a one-time calibration of the constellation of antennas in a predetermined configuration.

12. The reconfigurable phased array of claim 11, wherein the predetermined configuration comprises a completely flat configuration.

13. The reconfigurable phased array of claim 12, wherein the completely flat configuration yields a coupling matrix defined by:

$$S_{mn}^{flat} = \frac{a_m D_m(\theta_{mn}^{flat}) a_n D_n(\theta_{nm}^{flat})}{|\vec{l}_{mn}^{flat}|} e^{-j\left(\phi_m + \phi_n + k|\vec{l}_{mn}^{flat}|\right)},$$

wherein $$\theta_{mn}^{flat} = \frac{\pi}{2},$$

when $m \neq n$, and the constellation of antennas are each identical which makes $D_n(\theta) = D_m(\theta) = D(\theta)$ for all m's and n's.

14. The reconfigurable phased array of claim 13, wherein the physical constraint mapping further comprises simplifying the coupling matrix such that the coupling matrix is defined by:

$$S_{mn}^{flat} \cong \frac{a_m a_n D\left(\frac{\pi}{2}\right)^2}{|\vec{l}_{mn}^{flat}|} e^{-j\left(\phi_m + \phi_n + k|\vec{l}_{mn}^{flat}|\right)}.$$

15. The reconfigurable phased array of claim 14, wherein the physical constraint mapping further comprises defining a normalized transfer function, H.

16. The reconfigurable phased array of claim 15, wherein the normalized transfer function is defined by:

$$H_{mn} = \frac{D(\theta_{mn}) D(\theta_{nm})}{D\left(\frac{\pi}{2}\right)^2} \frac{|\vec{l}_{mn}^{flat}|}{|\vec{l}_{mn}|} e^{-jk\left(|\vec{l}_{mn}| - |\vec{l}_{mn}^{flat}|\right)}.$$

17. The reconfigurable phased array of claim 16, wherein the physical constraint mapping further comprises assuming a constant curvature of the constellation of antennas.

18. The reconfigurable phased array of claim 17, wherein assuming a constant curvature makes the normalized transfer function defined by:

$$H_{mn} = \frac{D\left(|\vec{l}_{mn}|\right)^{2|\vec{l}_{mn}^{flat}|}}{D\left(|\vec{l}_{mn}^{flat}|\right)^2 |\vec{l}_{mn}|} e^{-jk\left(|\vec{l}_{mn}| - |\vec{l}_{mn}^{flat}|\right)}.$$

19. The reconfigurable phased array of claim 1, wherein the physical constraint mapping comprises determining a polarity of the shape of the constellation of antennas.

20. The reconfigurable phased array of claim 19, wherein the polarity is defined by:

$$p = \text{sign}\left(\sum_{m \neq n}\left(\text{sign}|\vec{l}_{mn}^{flat}| - E_{mn}^1\right)\right),$$

wherein $\vec{l}_{mn}$ is a vector pointing from a phase center of antenna n to the phase center of antenna m and $E_{mn}^1$ is a first prediction Euclidean distance matrix (EDM), and wherein p=−1 indicates a convex shape and p=+1 indicates a concave shape.

21. The reconfigurable phased array of claim 19, wherein the physical constraint mapping further comprises performing recursive wrap correction to calculate a corrected phase wrap matrix constraining utilizing the polarity.

22. The reconfigurable phased array of claim 21, wherein the physical constraint mapping further comprises truncating a search space for Euclidean distance to a single one-wavelength range.

23. The reconfigurable phased array of claim 22, wherein truncating the search space comprises solving the following equation:

$$|\vec{l}_{mn}| \in [R'_{mn}\lambda, (R'_{mn}+1)\lambda).$$

24. The reconfigurable phased array of claim 23, wherein truncating the search space is defined by an Euclidean distance of:

$$E_{mn}^3 = \left(\underset{|\vec{l}_{mn}| \in [R'_{mn}\lambda,(R'_{mn}+1)\lambda)}{\arg\min} \left|H_{mn}^{meas} - H_{mn}\left(|\vec{l}_{mn}|\right)\right|\right)^2,$$

where $\vec{l}_{mn}$ is a vector pointing from a phase center of antenna n to the phase center of antenna m, $H_{mn}^{meas}$ is a measured transfer function, $H_{mn}$ is a transfer function model which is a function of the propagation distance, $R'_{mn}$ is the predicted number of phase wraps, and $\lambda$ is the free space wavelength.

25. The reconfigurable phased array of claim 1, wherein the constellation of antennas is part of a global antenna system and wherein the computer system is further configured to use the current position of each of the antennas in the constellation of antennas to stitch together with the position of other antennas in the global antenna system for a global reconstruction of the global antenna system.

\* \* \* \* \*